US012282845B2

(12) United States Patent
Liang et al.

(10) Patent No.: US 12,282,845 B2
(45) Date of Patent: Apr. 22, 2025

(54) MULTIOBJECTIVE COEVOLUTION OF DEEP NEURAL NETWORK ARCHITECTURES

(71) Applicant: Cognizant Technology Solutions U.S. Corporation, College Station, TX (US)

(72) Inventors: Jason Zhi Liang, Fremont, CA (US); Elliot Meyerson, San Francisco, CA (US); Risto Miikkulainen, Stanford, CA (US)

(73) Assignee: Cognizant Technology Solutions US Corp., Teaneck, NJ (US)

( * ) Notice: Subject to any disclaimer, the term of this patent is extended or adjusted under 35 U.S.C. 154(b) by 1043 days.

(21) Appl. No.: 16/671,274

(22) Filed: Nov. 1, 2019

(65) Prior Publication Data

US 2020/0143243 A1    May 7, 2020

Related U.S. Application Data

(60) Provisional application No. 62/754,242, filed on Nov. 1, 2018.

(51) Int. Cl.
*G06N 3/08*    (2023.01)
*G06N 3/045*    (2023.01)

(52) U.S. Cl.
CPC ............... *G06N 3/08* (2013.01); *G06N 3/045* (2023.01)

(58) Field of Classification Search
CPC ............................. G06N 3/08; G06N 3/0454
USPC .......................................................... 706/25
See application file for complete search history.

(56) References Cited

U.S. PATENT DOCUMENTS

| | | | |
|---|---|---|---|
| 5,140,530 | A | 8/1992 | Guha |
| 5,761,381 | A | 6/1998 | Arci |
| 5,845,266 | A | 12/1998 | Lupien |
| 5,920,848 | A | 7/1999 | Schutzer |
| 5,930,780 | A | 7/1999 | Hughes |
| 6,240,399 | B1 | 5/2001 | Frank |
| 6,249,783 | B1 | 6/2001 | Crone |
| 7,013,344 | B2 | 3/2006 | Megiddo |

(Continued)

FOREIGN PATENT DOCUMENTS

| | | |
|---|---|---|
| EP | 0762294 A2 | 3/1997 |
| EP | 2422276 A1 | 2/2012 |

(Continued)

OTHER PUBLICATIONS

Stanley, 2002, "Evolving Neural Networks Through Augmenting Topologies" (Year: 2002).*

(Continued)

*Primary Examiner* — Abdullah Al Kawsar
*Assistant Examiner* — Jun Kwon
(74) *Attorney, Agent, or Firm* — Dawn-Marie Bey; Bey & Cotropia PLLC

(57) ABSTRACT

An evolutionary AutoML framework called LEAF optimizes hyperparameters, network architectures and the size of the network. LEAF makes use of both evolutionary algorithms (EAs) and distributed computing frameworks. A multiobjective evolutionary algorithm is used to maximize the performance and minimize the complexity of the evolved networks simultaneously by calculating the Pareto front given a group of individuals that have been evaluated for multiple objectives.

3 Claims, 14 Drawing Sheets

(56) References Cited

U.S. PATENT DOCUMENTS

| | | |
|---|---|---|
| 7,246,075 B1 | 7/2007 | Testa |
| 7,370,013 B1 | 5/2008 | Aziz |
| 7,444,309 B2 | 10/2008 | Branke |
| 8,639,545 B2 | 1/2014 | Cases |
| 8,768,811 B2 | 7/2014 | Hodjat |
| 9,053,431 B1 | 6/2015 | Commons |
| 9,466,023 B1 | 10/2016 | Shahrzad |
| 9,785,886 B1 | 10/2017 | Andoni |
| 2002/0019844 A1 | 2/2002 | Kurowski |
| 2003/0014379 A1* | 1/2003 | Saias ............ G06Q 10/06 706/45 |
| 2003/0158887 A1 | 8/2003 | Megiddo |
| 2004/0143559 A1 | 7/2004 | Ayala |
| 2004/0210545 A1 | 10/2004 | Branke |
| 2004/0254901 A1 | 12/2004 | Bonabeau |
| 2005/0033672 A1 | 2/2005 | Lasry |
| 2005/0136480 A1 | 6/2005 | Brahmachari |
| 2005/0187848 A1 | 8/2005 | Bonissone |
| 2005/0197875 A1 | 9/2005 | Kauffman ............ 705/7 |
| 2005/0198103 A1 | 9/2005 | Ching |
| 2006/0218107 A1 | 9/2006 | Young |
| 2007/0100907 A1 | 5/2007 | Bayer |
| 2007/0143198 A1 | 6/2007 | Brandes |
| 2007/0143759 A1 | 6/2007 | Ozgur |
| 2007/0150435 A1 | 6/2007 | Murakawa |
| 2007/0185990 A1 | 8/2007 | Ono |
| 2008/0071588 A1 | 3/2008 | Eder |
| 2008/0228644 A1 | 9/2008 | Birkestrand |
| 2009/0125370 A1 | 5/2009 | Blondeau |
| 2009/0327178 A1 | 12/2009 | Jacobson |
| 2010/0030720 A1 | 2/2010 | Stephens |
| 2010/0111991 A1 | 5/2010 | Raitano |
| 2010/0182935 A1 | 7/2010 | David |
| 2010/0256795 A1 | 10/2010 | Mclaughlin |
| 2010/0257228 A1 | 10/2010 | Staggs |
| 2010/0257605 A1 | 10/2010 | Mclaughlin |
| 2010/0274742 A1 | 10/2010 | Hodjat |
| 2011/0040596 A1* | 2/2011 | Chen ............ G06Q 50/04 705/28 |
| 2012/0239592 A1 | 9/2012 | Esbensen |
| 2012/0313798 A1 | 12/2012 | Markram |
| 2013/0132042 A1* | 5/2013 | Chan ............ G06N 3/126 703/1 |
| 2013/0311412 A1 | 11/2013 | Lazar |
| 2014/0011982 A1 | 1/2014 | Marasco |
| 2015/0288573 A1* | 10/2015 | Baughman ......... G06N 3/126 706/52 |
| 2016/0048753 A1 | 2/2016 | Sussillo |
| 2016/0063359 A1 | 3/2016 | Szegedy |
| 2016/0329047 A1 | 11/2016 | Tur |
| 2016/0364522 A1 | 12/2016 | Frey |
| 2017/0001093 A1 | 1/2017 | Mollice |
| 2017/0109355 A1 | 4/2017 | Li |
| 2017/0148433 A1 | 5/2017 | Catanzaro |
| 2017/0193367 A1 | 7/2017 | Miikkulainen |
| 2017/0213156 A1 | 7/2017 | Hammond |
| 2017/0323636 A1 | 11/2017 | Xiao |
| 2018/0053092 A1 | 2/2018 | Hajizadeh ............ G06N 3/08 |
| 2018/0114115 A1 | 4/2018 | Liang |
| 2018/0114116 A1 | 4/2018 | Liang |
| 2018/0157972 A1 | 6/2018 | Hu |
| 2018/0240041 A1* | 8/2018 | Koch ............ G06F 16/24578 |
| 2018/0365557 A1* | 12/2018 | Kobayashi .......... G06N 3/126 |
| 2019/0065954 A1 | 2/2019 | Bittner, Jr. |

FOREIGN PATENT DOCUMENTS

| | | | |
|---|---|---|---|
| EP | 2422278 A1 | 2/2012 | |
| JP | H0810804 | 1/1996 | |
| JP | H08110804 | 4/1996 | |
| JP | H09114797 A | 5/1997 | |
| JP | 2001325041 A | 11/2001 | |
| JP | 2003044665 A | 2/2003 | |
| JP | 2004240671 A | 8/2004 | |
| JP | 2004302741 A | 10/2004 | |
| JP | 2005190372 A | 7/2005 | |
| JP | 2007207173 A | 8/2007 | |
| JP | 2007522547 A | 8/2007 | |
| JP | 2008129984 A | 6/2008 | |
| WO | 2005073854 A2 | 8/2005 | |
| WO | 2010120440 A2 | 10/2010 | |
| WO | 2017161233 | 9/2017 | |
| WO | 2018211138 | 11/2018 | |
| WO | 2018213840 | 11/2018 | |
| WO | 2019081705 | 5/2019 | |

OTHER PUBLICATIONS

Cui et al, Oct. 2018, "Evolutionary Stochastic Gradient Descent for Optimization of Deep Neural Networks" (Year: 2018).*

Jaimes & Coello, 2005, "MRMOGA: Parallel Evolutionary Multiobjective Optimization using Multiple Resolutions" (Year: 2005).*

Cruz-Ramirez, 2010, "Memetic pareto differential evolutionary artificial neural networks to determine growth multi-classes in predictive microbiology" (Year: 2010).*

Cruz-Ramirez et al, 2011, "Selecting the Best Artificial Neural Network Model from a Multi-Objective Differential Evolution Pareto Front" (Year: 2011).*

Jin & Sendhoff, 2008, "Pareto-Based Multiobjective Machine Learning: An Overview and Case Studies" (Year: 2008).*

Storsveen et al, 2008, "Evolving a 2D Model of an Eye using CPPNs" (Year: 2008).*

Shi, 2008, "An Empirical Comparison of Evolution and Coevolution for Designing Artificial Neural Network Game Players" (Year: 2008).*

Garciarena et al, Jul. 2018, "Evolved GANs for generating Pareto set approximations" (Year: 2018).*

Miikkulainen et al, Mar. 3, 2017, "Evolving Deep Neural Networks" (Year: 2017).*

Yao & Islam, 2008, "Evolving Artificial Neural Network Ensembles" (Year: 2008).*

Franz et al, 2017, "On the Combination of Coevolution and Novelty Search" (Year: 2017).*

U.S. Appl. No. 15/794,913 titled "Cooperative Evolution of Deep Neural Network Structures," filed Oct. 26, 2017.

U.S. Appl. No. 15/915,028, titled "Asynchronous Evaluation Strategy For Evolution of Deep Neural Networks," filed Mar. 3, 2018.

U.S. Appl. No. 62/468,224, titled "Asynchronous Evaluation Strategy For Evolution of Deep Neural Networks," filed Mar. 7, 2017.

U.S. Appl. No. 62/598,409, titled "Evolving Multitask Neural Network Structure," filed Dec. 13, 2017.

U.S. Appl. No. 62/627,161, titled "From Nodes to Networks: Evolving Recurrent Neural Networks," filed Feb. 6, 2018.

U.S. Appl. No. 62/627,658, titled "From Nodes to Networks: Evolving Recurrent Neural Networks," filed Feb. 7, 2018.

Utech, J., et al., "An evolutionary algorithm for drawing directed graphs," Proc. of the Int. Conf. on Imaging Science, Systems and Technology, 8 pages, 1998.

Written Opinion from Singapore Patent Office in related application SG 201003127-6, dated Jun. 16, 2011, 9 pp.

Xu, et al., "Inference of Genetic Regulatory Networks With Recurrent Neural Network Models Using Particle Swarm Optimization," Missouri University of Science and Technology, Oct. 2017 [retrieved on Feb. 14, 2019], Retrieved from the Internet: http://scholarsmine.mst.edu/cgi/viewcontent.cgi?article=1751&context=ele_comeng_facwork.

Yang et al., "Deep multi-task representation learning: A tensor factorisation approach," arXiv preprint arXiv: 1605.06391 (2016), 12 pages.

Yin et al., "ABCNN: Attention-Based Convolutional Neural Network for Modeling Sentence Pairs", Transactions of the Association for Computational Linguistics, (Dec. 16, 2015), vol. 4, pp. 259-272, XP081355040.

JP 2012-508660-Office Action dated Apr. 1, 2014, 8 pages.
JP 2012-508663-Office Action dated Apr. 1, 2014, 6 pages.

(56) References Cited

OTHER PUBLICATIONS

Juille, H., "Evolution of Non-Deterministic Incremental Algorithms as a New Approach for Search in State Spaces," Proc. 6th Int'l. Conf. on Genetic Algorithms, 1995 8 pp.
Jul. 27, 2012 Final Office Action in U.S. Appl. No. 12/267,287, 14 pp.
Julian G. Zilly, Rupesh Kumar Srivastava, Jan ICoutnik, and Jurgen Schniidhuber, "Recurrent Hiehwav Networks." CoRR abs/1607. 03474. 2016 (Arxiv: 1607.03474} 13 pages.
K. Janocha and W. M. Czarnecki, "On Loss Functions for Deep Neural Networks in Classification," arXiv: 1702.05659, 10 pages, 2017.
Kenneth O. Stanley and Risto Miikkulainen, "Evolving Neural Networks Through Augmenting Topologies," Evolutionary Computation, 10(2):99-127, 2002.
Kosorukoff, A. "Using incremental evaluation and adaptive choice of operators in a genetic algorithm," Proc. Genetic and Evolutionary Computation Conference, GECCO—Sep. 2002, 7pp.
Koza, J.R., "Genetic Programming: On the Programming of Computers by Means of Natural Selection", 1992, MIT Presspp. 1-609.
Krizhevsky, Alex, et al., "ImageNet Classification with Deep Convolutional Neural Networks", Advances in Neural Information Processing Systems 25 (NIPS 2012), Lake Tahoe, Nevada, Dec. 3-6, 2012, 9 pp.
Lee, Chi-Ho, et al., "Evolutionary ordered neural network with a linked-list encoding scheme," Proceedings of IEEE International Conference on Evolutionary Computation, IEEE, 5 pages, 1996.
Leon, C. et al., 'Parallel hypervolume-guided hyperheuristic for adapting the multi-objective evolutionary island model', NICSO 2008, Studies in Computational Intelligence, Nov. 12, 2008, vol. 236pp. 261-272.
Li, Xiaodong, and Michael Kirley. "The effects of varying population density in a fine-grained parallel genetic algorithm." Evolutionary Computation, 2002. CEC'02. 6 pages. Proceedings of the 2002 Congress on. vol. 2. IEEE2002.
Liang, et al., "Population-Based Training for Loss Function Optimization," 10 pages, arXiv:2002.04225vl (Feb. 11, 2020).
Lopez Haimes et al., "MRMOGA: parallel evolutionary multi-objective optimization using multiple resolutions," In: Proceedings of IEEE Congress on Evolutionary Computation, 2294-2301, 2005.
Meyerson, et al., "Pseudo-Task Augmentation: From Deep Multitask Learning to Intratask Sharing and Back," arXiv: 1803.04062, 10 pages, 2018.
Miikkulainen, Risto, et al., "Evolving Deep Neural Networks, " Mar. 4, 2017, 8 pp.
Misra et al., "Cross-stitch networks for multi-task learning," In Proceedings of the IEEE Conference on Computer Vision and Pattern Recognition, pp. 3994-4003. 2016.
Moriarty, David E., et al., "Forming neural networks through efficient and adaptive coevolution," Evolutionary Computation 5.4, 28 pages, 1997.
Myers, R.N. and Montgomery, D.C., "Response Surface Methodology: Process and Product Optimization Using Designed Experiments," New York: John Wiley and Sons, Inc., 1995pp. 1-700.
N. Hansen, et al., "Adapting arbitrary normal mutation distributions in evolution strategies: The covariance matrix adaptation," In Proceedings of IEEE International Conference on Evolutionary Computation, pp. 312-317, IEEE, 1996.
N. Hansen, et al., "Evaluating the CMA evolution strategy on multimodal test functions," International Conference on Parallel Problem Solving from Nature, Springer, pp. 282-291, 2004.
Nelson, A., "Fitness Functions in Evolutionary Robotics: A Survey and Analysis," Robotics and Autonomous Systems 57, 2009, 345-370.
Pantridge et al., Evolution of Layer Based Neural Networks: Preliminary Report, GECCO '16, pp. 1015-1022, Jul. 2016. (Year: 2016).

Poli R et al., "Genetic Programing: An introductory Tutorial and a Survey of Techniques and Applications," Univ. Essex School of Computer Science and Eletronic Engineering Technical Report No. CES-475, Oct. 2007, 112 pp.
R. Miikkulainen, J. Liang, E. Meyerson, et al., 2017, "Evolving Deep Neural Networks," CoRR, abs/1703.00548, Mar. 2017. 73 pages.
Remde et al. "Evolution of Fitness Functions to Improve Heuristic Performance," LION Dec. 8-10, 2007 II, LNCS 5313 pp. 206-219.
Risto Miikkulaiiien, "Evolving Multitask Neural Network Structure," The University of Texas at Austin and Sentient Technologies. Inc. Aug. 26, 2013, 22 pages.
Rosenbaum, et al., "Routing Networks: Adaptive Selection of Non-Linear Functions for Multi-Task Learning," In: Cornell University Library/Computer Science/Machine Learning, Dec. 31, 2017 [online] [retrieved on Mar. 15, 2019], Retrieved from the Internet: https://arxiv.org/abs/1711.01239v2. 16 pages.
Ruder, "An Overview of Multi-Task Learning in Deep Neural Networks," In: Cornell University Library /Computer Science/ Machine Learning, Jun. 15, 2017 [online] [retrieved on Mar. 15, 2019], Retrieved from the Internet: https://arxrv.org/abs/1706. 05098, 14 pages.
Sacks et al., "Design and Analysis of Computer Experiments," Statistical Science 4:4, 1989, 409-435.
Sakauchi et al., UNIFINE: A Next Generation Financial Solution System of Nihon Unisys Ltd., Technology Review UNISYS,' Japan, Nihon Unisys Ltd., Feb. 28, 2006, vol. 25, No. 4pp. 14-15.
Salami et al., "A fast evaluation strategy for evolutionary algorithms," Applied Soft Computing 2/3F (Jan. 2003) 156-173.
Santiago Gonzalez, "Loss Function Optimization Using Evolutionary Computation and Multivariate Function Approximators, Particularly Multivariate Taylor Expansions," 5 pp., Aug. 22, 2019.
Santiago Gonzalez, et al., "Improved Training Speed, Accuracy, and Data Utilization Through Loss Function Optimization," Version 1, arXiv: 1905.11528v1, dated May 27, 2019. 10 pages.
Santiago Gonzalez, et al., "Improved Training Speed, Accuracy, and Data Utilization Through Loss Function Optimization," Version 2, arXiv: 1905.11528v2, dated Feb. 10, 2020. 7 pages.
Santiago Gonzalez, et al., "Improved Training Speed, Accuracy, and Data Utilization Through Loss Function Optimization," Version 3, arXiv: 1905.11528v3, dated Apr. 27, 2020. 7 pages.
Schoreels, C., "Agent Based Genetic Algorithm Employing Financial Technical Analysis For Making Trading Decisions Using Historical Equity Market Data," IEEE/WIC/ACM International Conference on Intelligent Agent Technology (IAT20Q4), Bering, China, Sep. 20-24, 2004, pp. 421-424.
Scott, E. O., et al., "Understanding Simple Asynchronous Evolutionary Algorithms," Jan. 17-20, 2015, 15 pp.
Shazeer et al., "Outrageously large neural networks: The sparsely-gated mixiure-of-experts layer," arXiv preprint arXiv:1701.08538 (2017), 19 pages.
Snoek, et al., "Scalable Bayesian Optimization Using Deep Neural Networks", 2015, 13 pages.
Stanley et al. "Evolving neural networks through augmenting topologies." Evolutionary computation 10.2, 29 pages (2002) (Year: 2002).
Stanley, Kenneth O., et al., "Real-Time Evolution of Neural Networks in the Nero Video Game," AAAI, vol. 6, 2006, 4 pp.
Supplementary European Search Report dated Oct. 12, 2012 in EP 10770288, 12 pages.
Supplementary European Search Report dated Oct. 9, 2012 in EP 107702871, 11 pages.
Tanev, I., et al., "Scalable Architecture for Parallel Distributed Implementation of Genetic Programming on Network of Workstations," J. Systems Architecture, vol. 47, Jul. 2001, pp. 557-572.
Torresen, "A Dynamic Fitness Function Applied to Improve the Generalisation when Evolving a Signal Processing Hardware Architecture," Proc. EvoWorkshops 2002, 267-299 (12 pp).
U.S. Appl. No. 13/895,238—Office Action dated Jan. 2, 2014, 17 pages.
U.S. Appl. No. 14/014,063—Office Action dated May 7, 2014, 19 pages.

(56) References Cited

OTHER PUBLICATIONS

U.S. Appl. No. 15/794,905, titled Evolution of Deep Neural Network Structures, 46 pages, filed Oct. 26, 2017.
International Search Report and Written Opinion for PCT App. No. PCT/US19/61198, dated Mar. 11, 2020, 15 pp.
"CS 224D: Deep Learning for NLP, Lecture Notes: Part IV", 12 pp., Spring, 2015, 12 pages.
"CS 224D: Deep Learning for NLP, Lecture Notes: Part V", 6 pp., Spring, 2015, 6 pages.
"CS 224D: Deep Learning for NLP, Lecture Notes: Part III". 14 pp., Spring, 2016.
Jun. 22, 2011 Office Action in U.S. Appl. No. 12/267,287 (GNFN 2110-1), 16 pp.
Aug. 1, 2012 Office Action in U.S. Appl. No. 13/443,546 (GNFN 2110-17), 12 pp.
Aditya Rawal and Risto Miikkulainen, "From Nodes to Networks: Evolving Recurrent Neural Networks," GECCO '18, Jul. 15-19, 2018, 8 pages, Kyoto, Japan.
Akbarzadeh et al., "Friendship Modeling for Cooperative Co-Evolutionary Fuzzy Systems: A Hybrid GA—GP Algorithm," Proc. 22nd Int'l Conf. ofN. American FIPS, Jul. 2003, pp. 61-66.
Alex Castrounis, Innoarchtech, "Production vs. Development AI and Machine Learning, "published by O'Reilly Media, Copyright InnoArchiTech LLC 2020, 24 pages.
Alex Castrounis, Innoarchtech, "Advanced Analytics Packages, Frameworks, and Platforms," 29 pages, published by O'Reilly Media, Copyright InnoArchiTech LLC 2020.
Alex Castrounis, Innoarchtech, "Python vs. R for AI, Machine Learning, and Data Science," published by O'Reilly Media, Copyright InnoArchiTech LLC 2020, 27 pages.
AU 2010241594-Examination Report dated Oct. 8, 2013, 3 pages.
AU 2010241597-Examination Report dated Nov. 4, 2013, 4 pages.
Bartlett II, J. E., et al., "Organizational Research: Determining Appropriate Sample Size in Survey Research," IT, Learning, and Performance Journal, 19(1), Spring 2001, 8 pp.
Bilen et al. "Integrated Perception with Recurrent Multi-Task Neural Networks", NIPS, 2016, pp. 9.
Bongard et al., "Guarding Against Premature Convergence while Accelerating Evolutionary Search," Proc. 12th annual conf. of Genetic and evolutionary computation, Jul. 2010, 8 pages.
Bredeche et al., "On-Line , On-Board Evolution of Robot Controllers", Artifical Evolution: 9th International Conference, Evolution Artificielle , EA, Strasbourg, France, vol. 5975, (20090000), pp. 110-121, URL: https://dl.acm.org/citation.cfm?id=1883723.1883738, (Mar. 15, 2019), XP019146179.
Bredeche, Nicolas, et al., "On-line, on-board evolution of robot controllers," International Conference on Artificial Evolution, Springer, Berlin, Heidelberg, 13 pages, 2009.
Bui, L.T. et al., "Local models: An approach to distributed multi-objective optimization," Computational Optimization and Applications, vol. 42, No. I, Jan. 2009, pp. 105-139.
Castillo Tapia M.G. et al., "Applications of multi-objective evolutionary algorithms in economics and finance: A survey," Proc. IEEE Congress on Evolutionary Computation, Sep. 2007, pp. 532-539.
Davarynejad et al., "A Novel General Framework for Evolutionary Optimization: Adaptive Fuzzy Fitness Granulation," CEC Sep. 2007, 6 pp.
Davarynejad, "Fuzzy Fitness Granulation in Evolutionary Algorithms for complex optimization," Master of Science Thesis, Ferdowsi Univ. of Mashhad, Jun. 2007, 30 pages.
Ducheyne, E. et al., "Is Fitness Inheritance Useful for Real-World Applications?" Evolutionary Multi-Criterion Optimization, ser. LNCS 2631, 2003, pp. 31-42.
E. Meyerson and R. Mikkulainen, "Beyond Shared Hierarchies: Deep Multitask Learning Through Soft Layer Ordering," ICLR, 14 pages, 2018.
Enee, Gilles, et al., "Classifier Systems Evolving Multi-Agent System With Distributed Elitism," Proceedings of the 1999 Congress on Evolutionary Computation (CEC'99), vol. 3:6, Jul. 1999, pp. 1740-1746.

Exam Report for related application AU 2008323758, dated Apr. 20, 2012, 2 pp.
Extended EP SR for EP 08847214 (GNFN 2110-3) dated Nov. 26, 2012 , 9 pp.
Fernando et al., "Pathnet: Evolution channels gradient descent in super neural networks," arXiv preprint arXiv:1701.08734 (2017), 16 pages.
Fidelis, Marcos Vinicius, Heitor S. Lopes, and Alex A. Freitas, "Discovering Comprehensible Classification Rules With a Genetic Algorithm," 6 pages, Proceedings of the 2000 Congress on Evolutionary Computation, vol. 1, IEEE, 2000.
Fitzpatrick, J.M. et al., "GeneticAlgorithms in Noisy Environments," Machine Learning 3: 101-120, May 1988.
Garcia-Pedrajas, et al., "Cooperative Coevolution of Artificial Neural Network Ensembles For Pattern Classification," IEEE Transactions on Evolutionary Computation, vol. 9, No. 3, 32 pages, Jun. 3, 2005.
Garcia-Pedrajas, et al., "Cooperative-Coevolution-of-Artificial-Neural-Networks", 2005, 32 pages.
Gaspar-Cunha, A., et al., "A Multi-Objective Evolutionary" Algorithm Using Neural Networks to Approximate Fitness Evaluations, Int'l. J. Computers, Systems and Signals, 6(1), pp. 18-36, 2005.
Georgilakis, P.S. "Genetic Algorithm Model for Profit Maximization of Generating Companies in Deregulated Electricity Markets", Applied Artificial Intelligence, Jul. 2009, 23:6,538-552.
Gonzalez, et al., "Evolving Loss Functions With Multivariate Taylor Polynomial Parameterization," Version 2, published arXiv: 2002.00059v2), Feb. 10, 2020, 8 pages.
Gonzalez, et al., "Evolving Loss Functions With Multivariate Taylor Polynomial Parameterizations," Version 1, published arXiv: 2002.00059v1, Jan. 31, 2020. 12 pages.
Gonzalez, et al., "Optimizing Loss Functions Through Multivariate Taylor Polynomial Parameterization," Version 3 (published arXiv:2002.00059v3), Jun. 6, 2020, 13 pages.
H. Li, et al., "Visualizing the loss landscape of neural nets," Advances in Neural Information Processing Systems 31, pp. 6389-6399 (Curran Associates, Inc., 2018), arXiv:1712.09913v3, Nov. 7, 2018.
Hansen, et al., "Completely derandomized self-adaptation in evolution strategies," Evolutionary Computation, vol. 9, No. 2, pp. 159-195, 2001.
Hodjat, B., et al., "Introducing an Age-Varying Fitness Estimation Function," Genetic Finance, Chapter 5, Genetic Programming Theory and Practice, Springer Science+Business Media New York, Copyright 2013, pp. 59-71.
International Preliminary Report on Patentability for PCT App. PCT/US2019/061198, dated Nov. 18, 2020, 24 pp.
International Search Report and Written Opinion for Application No. PCT/US2018/064520, dated March 4. 2019. 8 pages.
International Search Report and Written Opinion for PCT Application No. PCT/US18/64428, dated Mar. 26, 2019, 12 pp.
International Search Report and Written Opinion for PCT Application No. PCT/US18/65472, dated Mar. 27, 2019, 8 pp.
International Search Report and Written Opinion for PCT Application No. PCT/US2008/82876, Dec. 23, 2008, 8 pp.
International Search Report and Written Opinion for PCT Application No. PCT/US2019/017175, dated Jun. 5, 2019, 10 pp.
International Search Report mailed Jul. 2, 2010 in PCT/US 10/32847 (GNFN 2510-2), 3 pages.
International Search Report mailed Jun. 29, 2010 in PCT/US 10/32841, 3 pages.
J.T. Barron, "A General and Adaptive Robust Loss Function," arXiv: 1701.03077, 2018, 19 pages.
James Bradbury, et al., "Quasi-Recurrent Neural Networks," arXiv:1611.01576v2, Nov. 21, 2016, 11 pp.; Retrieved from the Internet: https//arxiv.org/pdf/1611.01576.pdf?fbclid=1wAR3hreOvBGmJZe54-631X49XedcbsQoDYIRu87BcCHEBf_vMKF8FDKK_7Nw.
JP 2010-533295, Office Action dated Apr. 16, 2013, 3 pages.
Extended EPO Search Report, App. No. 19878418.3-1203/3942483 PCT/US2019061198, May 27, 2022.
Elsken Thomas et al., Efficient Multi-Objective Neural Architecture Search via Lamarckian Evolution, ICLR 2019, Feb. 26, 2019 (URL: https://arxiv.org/pdf/1804.09081.pdf).

(56) References Cited

OTHER PUBLICATIONS

Lu Zhichao et al., NSGA-NET neural architecture search using multi-objective genetic algorithm, Proceedings of the Genetic and Evolutionary Computation Conference, ACMPUB27, NY, NY, Jul. 13, 2019.
Jason Liang, et al., "Evolutionary Architecture Search for Deep Multitask Networks," GECCO '18, Jul. 15-19, 2018, Kyoto, Japan (See also https://arxiv.org/pdf/1803.03745.pdf).
Jason Liang, et al., "Evolutionary Neural AutoML for Deep Learning," GECCO '19, Jul. 13-17, 2019, Prague, Czech Republic (https://arxiv.org/pdf/1902.06827.pdf).

* cited by examiner

MULTIOBJECTIVE COEVOLUTION OF DEEP NEURAL NETWORK ARCHITECTURES

CROSS-REFERENCE TO RELATED APPLICATIONS

The present application claims the benefit priority to similarly titled U.S. provisional patent application Ser. No. 62/754,242 filed Nov. 1, 2018, the entirety of which is incorporated herein by reference.

Additionally, the present application incorporates by reference in their entireties the following commonly owned applications: U.S. Provisional Patent Application No. 62/578,035, titled "DEEP MULTITASK LEARNING THROUGH SOFT LAYER ORDERING," filed on Oct. 27, 2017; U.S. application Ser. No. 16/172,660, titled "BEYOND SHARED HIERARCHIES: DEEP MULTI-TASK LEARNING THROUGH SOFT LAYER ORDERING," filed on Oct. 26, 2018; U.S. patent application Ser. No. 15/794,905, titled "EVOLUTION OF DEEP NEURAL NETWORK STRUCTURES", filed on Oct. 26, 2017; and U.S. patent application Ser. No. 15/794,913, titled "COOPERATIVE EVOLUTION OF DEEP NEURAL NETWORK STRUCTURES," filed on Oct. 26, 2017; U.S. patent application Ser. No. 16/219,286 titled "EVOLVING MULTITASK NEURAL NETWORK STRUCTURE" filed on Dec. 13, 2018; U.S. patent application Ser. No. 16/212,830 titled "EVOLUTIONARY ARCHITECTURES FOR EVOLUTION OF DEEP NEURAL NETWORKS" filed on Dec. 7, 2018; and U.S. patent application Ser. No. 16/219,286, titled "EVOLUTION OF ARCHITECTURES FOR MULTITASK NEURAL NETWORKS" filed on Dec. 13, 2018.

BACKGROUND

Field of the Embodiments

The present embodiments are generally directed to modification of the CoDeepNeat ("CDN") evolutionary algorithm ("EA") to support multiobjective optimization and a framework for implementation.

SUMMARY OF THE RELATED ART

Deep neural networks (DNNs) have produced state-of-the-art results in many benchmarks and problem domains. However, the success of DNNs depends on the proper configuration of its architecture and hyperparameters. Such a configuration is difficult and as a result, DNNs are often not used to their full potential. In addition, DNNs in commercial applications often need to satisfy real-world design constraints such as size or number of parameters. To make configuration easier, automated machine learning (AutoML) systems for deep learning have been developed, focusing mostly on optimization of hyperparameters.

Applications of machine learning and artificial intelligence have increased significantly recently, driven by both improvements in computing power and quality of data. In particular, deep neural networks (DNN) learn rich representations of high-dimensional data, exceeding the state-of-the-art in a variety of benchmarks in computer vision, natural language processing, reinforcement learning, and speech. Such state-of-the art DNNs are very large, consisting of hundreds of millions of parameters, requiring large computational resources to train and run. They are also highly complex, and their performance depends on their architecture and choice of hyperparameters. Much of the recent research in deep learning indeed focuses on discovering specialized architectures that excel in specific tasks. There is much variation between DNN architectures (even for single task domains) and so far, there are no guiding principles for deciding between them. Finding the right architecture and hyperparameters is essentially reduced to a black-box optimization process. However, manual testing and evaluation is a tedious and time consuming process that requires experience and expertise. The architecture and hyperparameters are often chosen based on history and convenience rather than theoretical or empirical principles, and as a result, the network has does not perform as well as it could. Therefore, automated configuration of DNNs is a compelling approach for three reasons: (1) to find innovative configurations of DNNs that also perform well, (2) to find configurations that are small enough to be practical, and (3) to make it possible to find them without domain expertise.

Currently, the most common approach to satisfy the first goal is through partial optimization. Through partial optimization, users might tune a few hyperparameters or switch between several fixed architectures, but rarely optimize both the architecture and hyperparameters simultaneously. This approach is understandable since the search space is massive and existing methods do not scale as the number of hyperparameters and architecture complexity increases. The standard and most widely used methods for hyperparameter optimization is grid search, where hyperparameters are discretized into a fixed number of intervals and all combinations are searched exhaustively. Each combination is tested by training a DNN with those hyperparameters and evaluating its performance with respect to a metric on a benchmark dataset. While this method is simple and can be parallelized easily, its computational complexity grows combinatorially with the number of hyperparameters, and becomes intractable once the number of hyperparameters exceeds four or five. Grid search also does not address the question of what the optimal architecture of the DNN should be, which may be just as important as the choice of hyperparameters. A method that can optimize both structure and parameters is needed.

Recently, commercial applications of deep learning have become increasingly important and many of them run on smartphones. Unfortunately, the hundreds of millions of weights of modern DNNs cannot fit into the few gigabytes of RAM in most smartphones or other handheld devices. Therefore, an important second goal of DNN optimization is to minimize the complexity or size of a network, while simultaneously maximizing its performance. Thus, a method for optimizing multiple objectives is needed to meet the second goal.

In order to achieve the third goal, i.e. democratizing AI, systems for automating DNN configuration have been developed, such as Google AutoML and Yelp's Metric Optimization Engine (MOE, also commercialized as a product called SigOpt). However, existing systems are often limited in both the scope of the problems they solve and how much feedback they provide to the user. For example, the Google AutoML system is a black-box that hides the network architecture and training from the user; it only provides an API which the user can use to query on new inputs. MOE is more transparent on the other hand, but since it uses a Bayesian optimization algorithm underneath, it only tunes hyperparameters of a DNN. Neither systems minimizes the size or complexity of the networks.

Evolutionary algorithms (EAs) are a class of algorithms widely used for black-box optimization of complex, multimodal functions. EAs rely on biological-inspired mechanisms to improve iteratively upon a population of candidate solutions to the objective function. The CMA-ES (covariance matrix adaptation evolution strategy) EA has been successfully applied to DNN hyperparameter tuning, but is limited to continuous optimization and therefore does not extend naturally to architecture search. But, EAs are well-suited for the architecture search because they can optimize arbitrary structure. EAs have an advantages over prior art reinforcement learning methods for architecture searching since they can optimize over much larger search spaces.

Accordingly, a need remains for an AutoML system and process which is able to optimize both the architecture and hyperparameters, minimize the complexity or size of a network, i.e., optimize multiple objectives, and democratize AI.

SUMMARY OF EMBODIMENTS

The following is a representative listing of various embodiments described herein and is not exhaustive.

In a first embodiment, a method for co-evolution of hyperparameters and architecture in accordance with multiple objective optimization, the method includes: initializing a first population of modules and blueprints containing a combination of one or more modules, wherein for each species of modules in the first population and during each generation in a plurality of generations of subsequent populations: creating a first set of empty species; for each non-empty species, determining Pareto front of each non-empty species in accordance with at least a first and second objective; removing individuals in the Pareto front of each non-empty species and adding them to the first set of empty species to form one or more sets of new species; replacing each non-empty species with the one more sets of new species; truncating the one or more sets of new species by removing a last fraction; generating new individuals using procreation, including crossover and/or mutation; and adding new individuals to the first set of new species.

In a second embodiment, method for co-evolution of hyperparameters and architecture in accordance with multiple objective optimization, the method includes: for each generation of an evolution run: generating an assembled network population in accordance with evolved blueprints and modules; adding to the assembled network population left over networks from a last generation; evaluating each network in the assembled network population based on each of a plurality of fitness function objectives; creating a new assembled network population; when the assembled network population is not empty, determining Pareto front of the assembled network population; removing individuals in the Pareto front of the assembled network population and adding them to the new assembled network population; replacing the assembled network population with the new assembled network population; and truncating the new assembled network population by removing a last fraction.

In a third embodiment, an automated machine learning (AutoML) implementation system includes: an algorithm layer for evolving deep neural network (DNN) hyperparameters and architectures; a system layer for parallel training of multiple evolved DNNs received from the algorithm layer, determination of one or more fitness values for each of the received DNNs, and providing the one or more fitness values back to the algorithm layer for use in additional generations of evolving DNNs; and a program layer for informing the algorithm layer and system layer of one or more desired optimization characteristics of the evolved DNNs.

BRIEF DESCRIPTION OF THE FIGURES

The embodiments described herein should be considered with reference to the following detailed description when read with the accompanying drawings in which.

DETAILED DESCRIPTION

Figure 1:
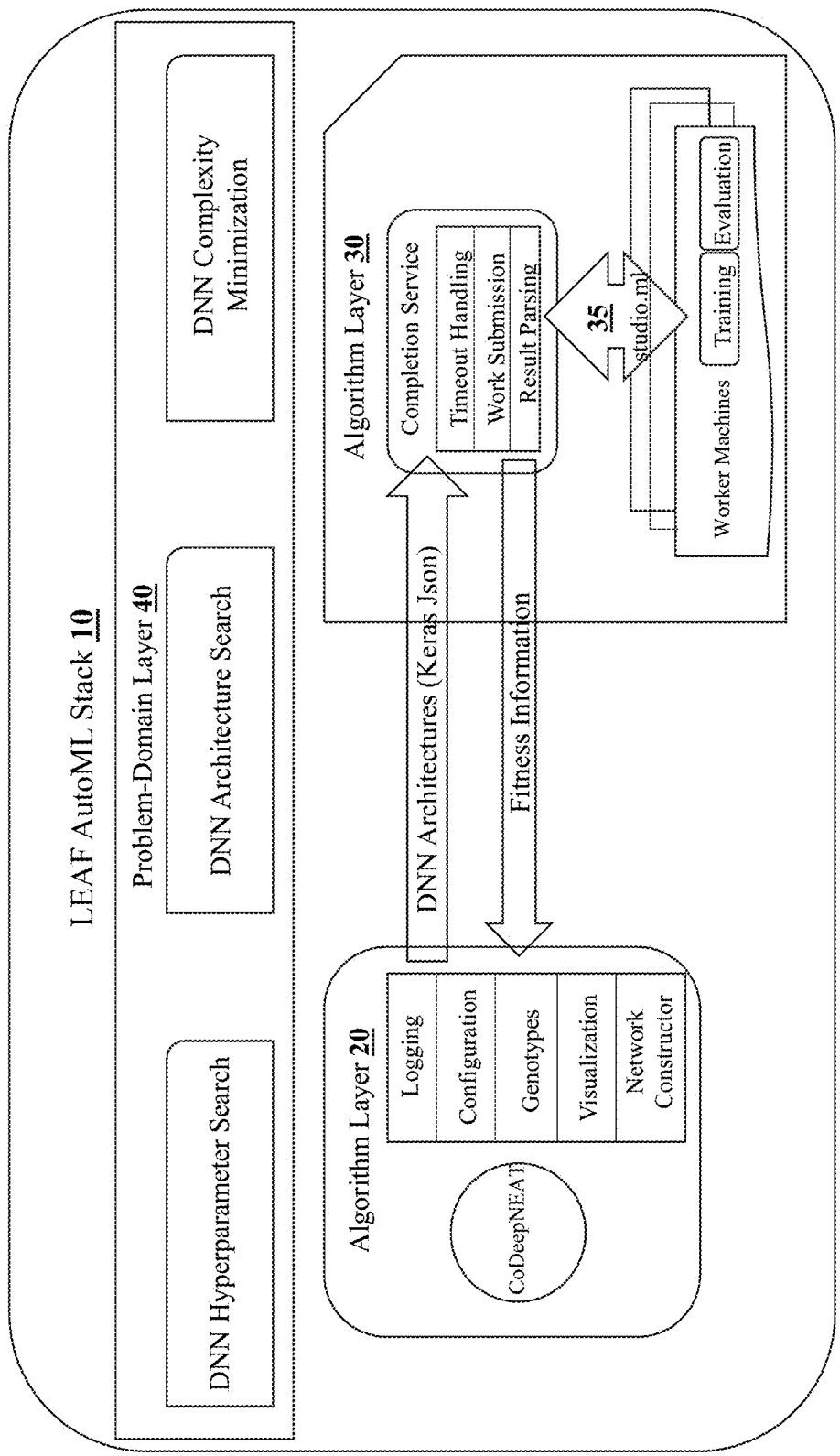
FIG. 1 is a high level schematic of a LEAF AutoML implementation system in accordance with one or more embodiments described herein.

FIG. 1 provides a visualization of the AutoML implementation system 10 described herein and referred to as LEAF (Learning Evolutionary AI Framework). As described further below, LEAF leverages and extends the existing state-of-the-art evolutionary algorithm for architecture search called CoDeepNEAT (CDN), which evolves both hyperparameters and network structure. While LEAF's hyperparameter optimization ability already matches those of other AutoML systems, LEAF's additional ability to optimize DNN architectures makes it possible to achieve state-of-the-art results. The speciation and complexification heuristics inside CDN also allow for it to be adapted to multiobjective optimization to find minimal architectures.

LEAF 10 is composed of three main components: algorithm layer 20, system layer 30, and problem-domain layer 40. The algorithm layer 20 allows LEAF to evolve DNN hyperparameters and architectures. The system layer 30 parallelizes training of DNNs on cloud compute infrastructure such as, but not limited to, Amazon AWS, Microsoft Azure, or Google Cloud, which is required to evaluate the fitness of each of the networks evolved in the algorithm layer 20. The algorithm layer 20 sends the evolved network architectures in Keras JSON format to the system layer 30 and receives fitness (evaluation) information back. These two layers work in tandem to support the problem-domain layer 40, where LEAF solves problems such as hyperparameter tuning, architecture search, and complexity minimization to optimize DNNs. The decoupling of the algorithm and system layers allows LEAF to be easily applied to varying problem types, e.g., via options for multiobjective optimization and different types of neural network layers.

The core of the algorithm layer 20 is composed of CDN (and variation thereof, MCDN, described herein), a cooperative coevolutionary algorithm based on NEAT, for evolving DNN architectures and hyperparameters. Cooperative coevolution is a technique used in evolutionary computation to discover complex behavior during evaluation by combining simpler components together. It has been used with success in many domains, including function optimization, predator-prey dynamics, and subroutine optimization. The specific coevolutionary mechanism in CDN is inspired by Hierarchical SANE but is also influenced by component-evolution approaches of ESP and CoSyNE. These methods differ from conventional neuroevolution in that they do not evolve entire networks. Instead, both approaches evolve components that are then assembled into complete networks for fitness evaluation.

CDN follows the same fundamental process as NEAT: first, a population of chromosomes of minimal complexity is created. Each chromosome is represented as a graph and is also referred to as an individual. Over generations, structure (i.e. nodes and edges) is added to the graph incrementally through mutation. As in NEAT, mutation involves randomly adding a node or a connection between two nodes. During crossover, historical markings are used to determine how genes of two chromosomes can be lined up and how nodes can be randomly crossed over. The population is divided into species (i.e. subpopulations) based on a similarity metric. Each species grows proportionally to its fitness and evolution occurs separately in each species.

CDN differs from NEAT in that each node in the chromosome no longer represents a neuron, but instead a layer in a DNN. Each node contains a table of real and binary valued hyperparameters that are mutated through uniform Gaussian distribution and random bit-flipping, respectively. These hyperparameters determine the type of layer (such as convolutional, fully connected, or recurrent) and the properties of that layer (such as number of neurons, kernel size, and activation function). The edges in the chromosome are no longer marked with weights; instead they simply indicate how the nodes (layers) are connected. The chromosome also contains a set of global hyperparameters applicable to the entire network (such as learning rate, training algorithm, and data preprocessing).

Figure 2:
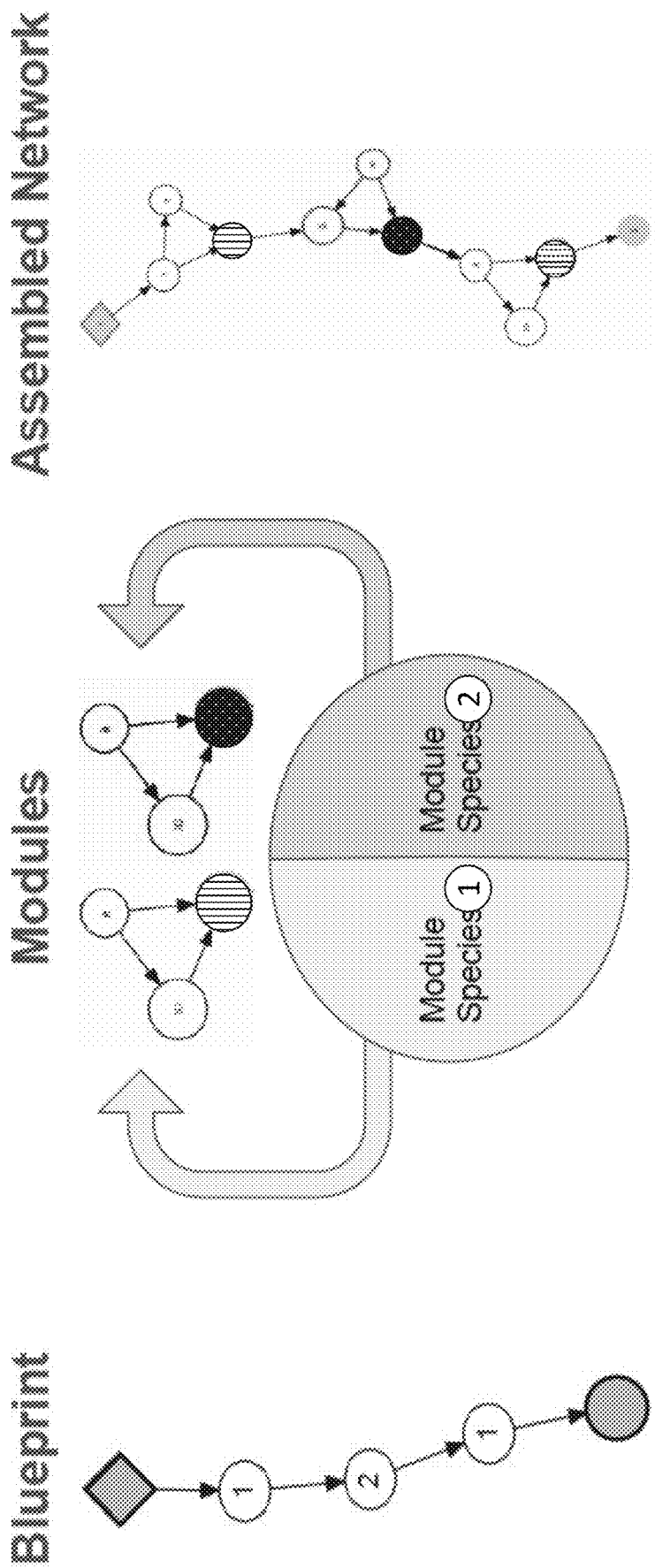
FIG. 2 is a schematic showing how CDN assembles networks for fitness evaluations in accordance with one or more embodiments described herein.

As summarized in Algorithm A below and illustrated schematically in FIG. 2, two populations of modules and blueprints are evolved separately using mutation and crossover operators of NEAT. A description of NEAT may be found in the reference to Stanley, et al., Evolving Neural Networks through Augmenting Topologies, Evolutionary Computation 10(2): 99-127, MIT 2002, which is incorporated herein by reference in its entirety, and in other references know to those skilled in the art. The blueprint chromosome (also known as an individual) is a graph where each node contains a pointer to a particular module species. In turn, each module chromosome is a graph that represents a small DNN. During fitness evaluation, the modules and blueprints are combined to create a large assembled network. For each blueprint chromosome, each node in the blueprint's graph is replaced with a module chosen randomly from the species to which that node points. If multiple blueprint nodes point to the same module species, then the same module is used in all of them. After the nodes in the blueprint have been replaced, the individual is converted into a DNN.

---
Algorithm A CoDeepNEAT (CDN)

1. Given population of modules/blueprints
2. For each blueprint $B_i$ during every generation:
   3. For each node $N_j$ in $B_i$
      4. Choose randomly from module species that $N_j$ points to
      5. Replace $N_j$ with randomly chosen module $M_j$
   6. When all nodes in $B_i$ are replaced, convert $B_i$ to assembled network $N_i$
7. Evaluate fitness of the assembled networks N
8. For each network $N_i$
   9. Attribute fitness of $N_i$ to its component blueprint $B_i$ and modules $M_j$
10. Evolve blueprint and module population with NEAT.

---

The assembled networks are evaluated by first letting the networks learn on a training dataset for the task and then measuring their performance with an unseen validation set. The fitnesses, i.e. validation performance, of the assembled networks are attributed back to blueprints and modules as the average fitness of all the assembled networks containing that blueprint or module. This scheme reduces evaluation noise and allows blueprints or modules to be preserved into the next generation even if they are occasionally included in a poorly performing network. After CDN finishes running, the best evolved network is trained until convergence, and evaluated on another holdout testing set.

One of the main challenges in using CDN to evolve the architecture and hyperparameters of DNNs is the computational power required to evaluate the networks. However, because evolution is a parallel search method, the evaluation of individuals in the population every generation can be distributed over hundreds of worker machines, each equipped with a dedicated GPU, e.g., GPU equipped machines running on Microsoft Azure or the like as would be known to one skilled in the art.

To this end, the system layer 30 of LEAF 10 uses an API called the completion service 50 that is part of an open-source package called StudioML which is a model management framework written in Python for managing scheduling, running, monitoring and managing artifacts of machine learning experiments. First, the algorithm layer 20 sends candidate networks, i.e., individuals, ready for fitness evaluation in the form of Keras JSON to the system layer 30 server node. Next, the server node submits the candidate networks to the completion service 35. They are pushed onto a queue (buffer) and each available worker node pulls a single candidate network (individual) from the queue to train. After training is finished, fitness is calculated for the candidate network and the information is immediately returned to the server. The results are returned one at a time, and in no guaranteed order, through a separate return queue. By using the completion service 35 to parallelize evaluations, thousands of candidate networks are trained in a matter of days, thus making architecture search tractable.

The problem-domain layer 40 solves the three tasks mentioned earlier, i.e. optimization of hyperparameters, architecture, and network complexity, using CDN as a starting point. Regarding the use of CDN for hyperparameter optimization and architecture search, a detailed description of these processes may be found in at least the following co-owned patent applications: U.S. application Ser. No. 16/172,660, titled "BEYOND SHARED HIERARCHIES: DEEP MULTITASK LEARNING THROUGH SOFT LAYER ORDERING," filed on Oct. 26, 2018; U.S. patent application Ser. No. 16/212,830, titled "EVOLUTIONARY ARCHITECTURES FOR EVOLUTION OF DEEP NEURAL NETWORKS" filed on Dec. 7, 2018 and U.S. patent application Ser. No. 16/219,286, titled "EVOLUTION OF ARCHITECTURES FOR MULTITASK NEURAL NETWORKS" filed on Dec. 13, 2018, which are incorporated herein by reference in their entireties. And in at least the following additional references: Jason Liang, Elliot Meyerson, and Risto Miikkulainen, "Evolutionary Architecture Search for Deep Multitask Networks," In Proceedings of the Genetic and Evolutionary Computation Conference (GECCO '18) and E. Meyerson and R. Miikkulainen, "Beyond Shared Hierarchies: Deep Multitask Learning through Soft Layer Ordering," ICLR (2018), the contents of which are also incorporated herein by reference.

Finally, LEAF 10 can apply a modified CoDeepNEAT algorithm referred to as multiobjective CoDeepNEAT ("MCDN") to achieve DNN complexity minimization with application of multiobjective searching. For comparison, CDN is a single-objective evolutionary algorithm, wherein evolutionary elitism is applied in both the blueprint and the module populations. The elitism involves preserving the top fraction Ft of the individuals within each species into the next generation based on their ranking within the species. Normally, this ranking is based on sorting the individuals by a single, primary objective fitness.

In MCDN, this ranking is computed using multiple fitness values for each individual. The ranking is based on generating successive Pareto fronts from the individuals and ordering the individuals within each Pareto front based on either the primary objective and/or a secondary objective value.

In addition, elitism is applied at the coevolutionary level where networks are assembled together from the blueprints and modules. In particular, elitism is used to determine the assembled networks that are preserved and reevaluated in the next generation. The ranking method that is used to determine what fraction ($F_u$) of assembled networks are preserved is the same as the method used for the blueprints and modules.

While the ranking method can be generalized to any number of objectives, the exemplary embodiment described herein inside MCDN is limited to two objectives. This restriction to two is for the sake of simplicity, but one skilled in the art will recognize the possibility of using more than two objectives.

Algorithm B gives a detailed explanation of how the ranking is performed within a single generation of MCDN for the blueprints and modules. Similarly, Algorithm C details how the assembled networks are ranked. Algorithm D shows how the Pareto front, which is necessary for ranking, is calculated given a group of individuals that have been evaluated for each objective. There is also an optional configuration parameter for MCDN (last line in Algorithm D) that allows the individuals within each Pareto front to be sorted and ranked with respect to the secondary objective instead of the primary one. This configuration parameter can control whether the primary or secondary objective is favored more during evolution. The right choice for this configuration parameter will depend on the use case.

| Algorithm B Ranking for Blueprints/Modules in MCDN |
|---|
| 1. Given population of modules/blueprints, evaluated primary and secondary objectives (X and Y) |
| 2. For each species $S_i$ during every generation: |
|     3. Create new empty species $\hat{S}_i$ |
|     4. While $S_i$ is not empty |
|         5. Determine Pareto front of $S_i$ by passing $X_i$ and $Y_i$ to Alg. D |

| Algorithm B Ranking for Blueprints/Modules in MCDN |
|---|
|         6. Remove individuals in Pareto front of $S_i$ and add to $\hat{S}_i$ |
|     7. Replace $S_i$ with $\hat{S}_i$ |
|     8. Truncate $S_i$ by removing the last fraction $F_f$ |
|     9. Generate new individuals using mutation/crossover |
|    10. Add new individuals to $\hat{S}_i$, proceed as normal |

| Algorithm C Ranking for Assembled Networks in MCDN |
|---|
| 1. For each generation: |
|     2. Create archive A using leftover networks from last generation |
|     3. Add to A newly assembled networks |
|     4. Evaluate all networks in A on each objective $O_i$ |
|     5. Create new empty archive $\hat{A}$ |
|     6. While A is not empty |
|         7. Determine Pareto front of A using Alg. D |
|         8. Remove individuals in Pareto front of A and add to $\hat{P}$ |
|     9. Replace A with $\hat{A}$ |
|    10. Truncate $\hat{A}$ by removing the last fraction $F_u$ |

| Algorithm D Calculating Pareto front for MCDN |
|---|
| 1. Given list of individuals I, and corresponding objective fitnesses X and Y |
| 2. Sort I in descending order by first objective fitnesses X |
| 3. Create new Pareto front PF with first individual $I_0$ |
| 4. For each individual $I_i$, i > 0 |
|     5. If $Y_i$ is greater than the $Y_j$, where $I_j$ is last individual in PF |
|         6. Append $I_i$ to PF |
| 7. Sort PF in descending order by second objective Y (Optional) |

Thus, MCDN can be used to maximize the performance and minimize the complexity of the evolved networks simultaneously. While performance is usually measured as the loss on the unseen set of samples, there are many ways to characterize the complexity of a DNN. These include the number of parameters, the number of floating point operations (FLOPS), and the training/inference time of the network. The most commonly used metric is number of parameters because other metrics can change depending on the deep learning library implementation and performance of the hardware. In addition, the number of parameters metric is becoming increasingly important in mobile applications as mobile devices are highly constrained in terms of memory and require networks with as high performance per parameter ratio as possible.

In a first example of improved performance of MCDN over CDN, MCDN used novelty as the secondary objective to the primary fitness objective. Novelty search is a powerful method for overcoming deceptive traps in evolution and local optima in the fitness landscape. It avoids deceptive local optima by pressuring the EA to search for solutions that result in novel phenotypical behaviors and encourage exploration of the search space. Novelty search is combined with MCDN by using it as a secondary objective in addition to the performance of the network (fitness), which is still the primary objective. See for example, U.S. application Ser. No. 16/268,463 titled Enhanced Optimization with Composite Objectives and Novelty Selection which is incorporated herein by reference in its entirety for examples of using novelty search and selection in evolution.

In architecture search, the novelty behavior metric is not as well defined as in the reinforcement learning domain. The evolved network is not interacting with an environment where there is an easily observable behavior. Thus, the behavior metric is instead defined by extracting features or embeddings from the graph structure of the evolved networks.

During evaluation of a candidate network, these features are computed at the end of training and are then concatenated into a 11-dimensional long behavior vector. In an exemplary embodiment, the following list of hand-crafted features are used to characterize the behavior of each evolved network for novelty search.

1. Number of parameters of the network
2. Number of layers in the network (N)
3. Number of connections between layers (E)
4. The length of the longest path within the network
5. The density of the network, defined as $$D = \frac{|E|}{|N|(|N|-1)}$$

6. Maximum of the number of connections for each layer
7. Mean of the number of connections for each layer
8. Standard deviation of the number of connections for each layer
9. Maximum of the page rank for each layer
10. Mean of the page rank for each layer
11. Standard deviation of the page rank for each layer The vector is then added to a common shared novelty archive, which is used to compute the novelty value for the network by calculating its Euclidean distance to the closest other network in behavior space. The novelty score and fitness for the network are then returned back to MCDN. As the fitness is the only metric that truly matters in the end, the parameter described earlier is configured to favor the primary objective (fitness).

In a first exemplary application of the aforementioned process, the following describes the results from applying MCDN with novelty as secondary objective to the MSCOCO image captioning domain. The dataset used to evaluate the effectiveness of the candidate networks MSCOCO (Common Objects in Context), a widely used benchmark dataset in image captioning. The dataset contains 500,000 captions for roughly 100,000 images that are generated by humans using Amazon Mechanical Turk. The images range from straightforward depictions of everyday common objects to more complicated scenes, e.g., where humans or animals interact with these objects. The setup for the MSCOCO domain evaluation is shown in Table 1 below.

TABLE 1

| | Range |
|---|---|
| Global Hyperparameter | |
| Learning Rate | [0.0001, 0.1] |
| Momentum | [0.68, 0.99] |
| Shared Embedding Size | [128.512] |
| Embedding Dropout | [0, 0.7] |
| LSTM Recurrent Dropout | {True, False} |
| Nesterov Momentum | {True, False} |
| Weight Initialization | {Glorot normal, He normal} |
| Node Hyperparameter | |
| Layer Type | {Dense, LSTM} |
| Merge Method | {Sum, Concat} |
| Layer Size | {128,256} |
| Layer Activation | {ReLU, Linear} |
| Layer Dropout | [0, 0.7] |

Figure 3:
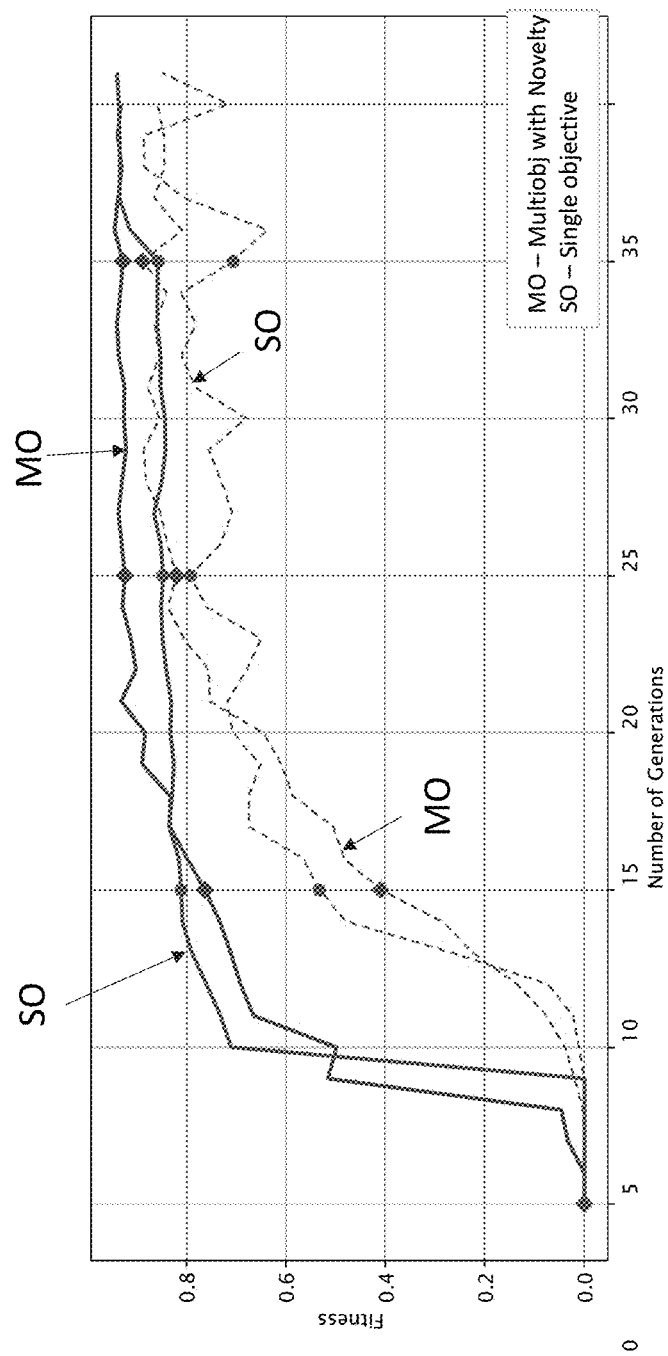
FIG. 3 graphs comparison of CDN and MCDN fitness on the MSCOCO image captioning domain wherein MCDN uses novelty and secondary objective.

The primary objective, fitness, is the performance relative to a baseline image captioning architecture on common sentence similarity metrics such as BLEU, METEOR, and CIDER. FIG. 3 shows how fitness improved during evolution for both MCDN and CDN. FIG. 3 provides a comparison of fitness over generations of MCDN (multiobjective) and CDN (single-objective) on the MSCOCO image captioning domain. Solid lines show the fitness of best assembled network and dotted lines shows the mean fitness MCDN is able to converge at generation 15, 15 generations faster than CDN. It is interesting to note that MCDN improved slower than CDN for the first 12 generations. This is expected since MCDN used both novelty and fitness as the objectives and novelty required some time to build up an archive of individuals to be able to accurately calculate distances of individuals in behavior space. However, after 12 generations, MCDN began to outperform CDN, and was able to converge roughly 15 generations before CDN. Novelty encouraged exploration of the architecture search space and allowed MCDN to overcome deceptive traps in network design. Both the multiobjective MCDN and single objective CDN eventually converged to around the same fitness ceiling. This fitness ceiling does not represent the fitness performance of evolved networks and was due to the reduced number of training epochs used during evolution to keep the time of each generation reasonable.

Figure 4A:
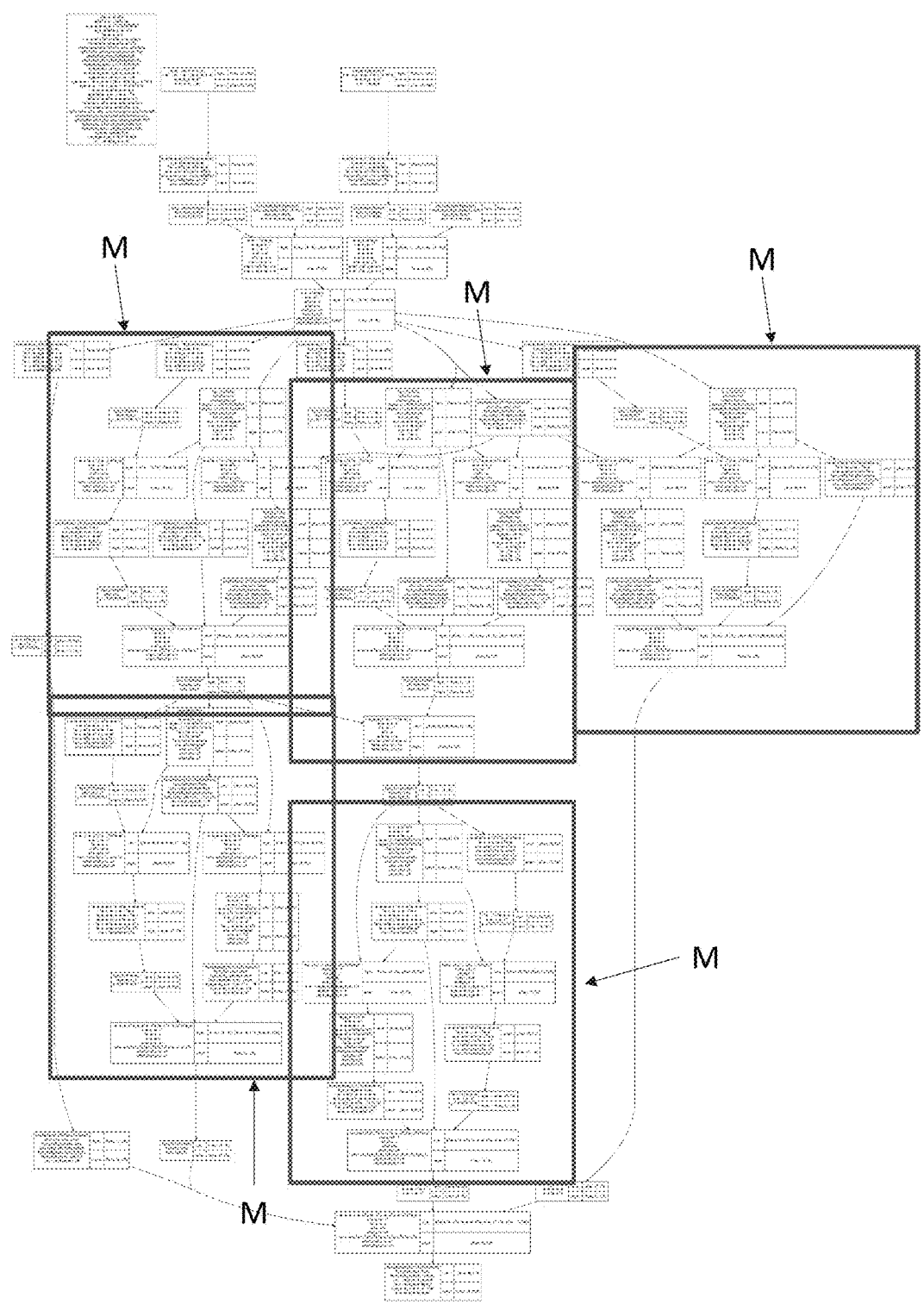
FIGS. 4a and 4b illustrate visualizations of the best evolved networks by MCDN (FIG. 4a) and CDN (FIG. 4b) on the MSCOCO domain.
Figure 4B:
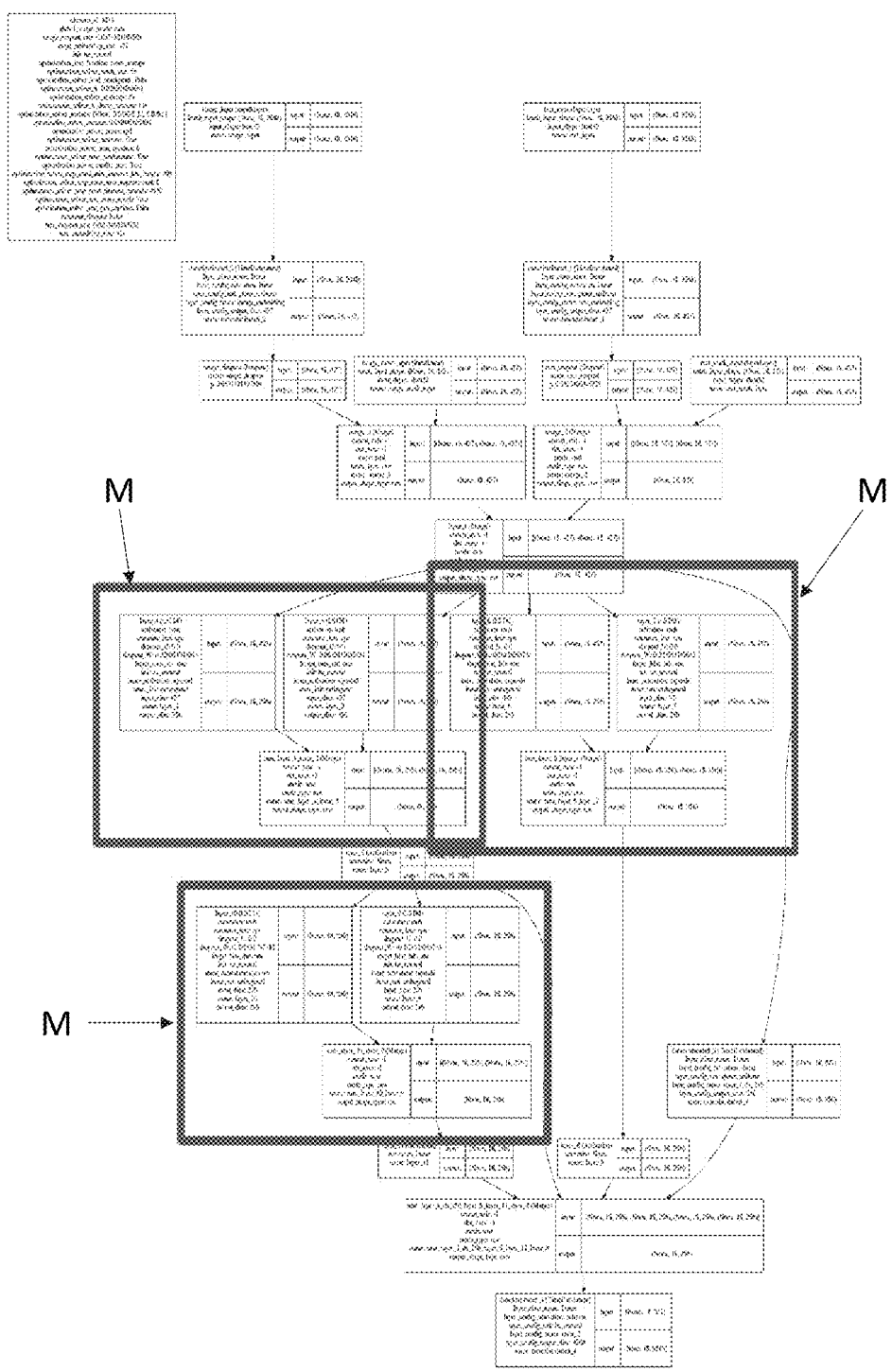

FIG. 4a shows a visualization of the architecture of the best evolved network by MCDN while FIG. 4b shows a visualization of the best architecture of the best evolved network by CDN on the image capturing domain. Both algorithms were run for approximately the same number of generations and with the same evolution parameters (except for those related to multiobjective search) but the networks discovered are very different. The modules (M) in both networks are highlighted by the large overlayed boxes. Both networks are able to reach similar fitness after six epochs of training, but the network evolved by MCDN is significantly more complex with regards to the number of layers, modules, and the depth of the network and contains more novel module structures. The increased complexity suggests that novelty is helping evolution escape local optima in fitness that are caused by the networks being not deep enough.

Next, LEAF's ability to democratize AI, improve the state-of-the-art, and minimize solutions, is verified experimentally on two difficult real-world domains: (1) Wikipedia comment toxicity classification and (2) Chest X-rays multitask image classification. The performance and efficiency of the LEAF framework, including application of MCDN, is compared against existing AutoML systems.

Wikipedia is one of the largest encyclopedias that is publicly available online, with over 5 million written articles for the English language alone. Unlike traditional encyclopedias, Wikipedia can be edited by any user who registers an account. As a result, in the discussion section for some articles, there are often vitriolic or hateful comments that are directed at other users. These comments are commonly referred to as toxic and it has become increasingly important to detect toxic comments and remove them. The Wikipedia Detox dataset (Wikidetox) is a collection of 160K example comments that are divided into 93K training, 31K validation, and 31K testing examples. The labels for the comments are generated by humans using crowdsourcing methods and contain four different categories for toxic comments. However, following previous work, all toxic comment categories are combined, thus creating a binary classification problem. The dataset is also unbalanced with only about 9.6% of the comments actually being labeled as toxic.

In the present example, LEAF was configured to use standard CDN to search for well performing architectures in this domain. The search space for these architectures was defined using recurrent (LSTM—Long short-term memory) layers as the basic building block. Since comments are essentially an ordered list of words, recurrent layers (having been shown to be effective at processing sequential data) were a natural choice. In order for the words to be given as input into a recurrent network, they must be converted into an appropriate vector representation first. For this example, prior to being provided as input to the network, the comments were preprocessed using FastText, a recently introduced method for generating word embeddings that improves upon the more commonly used Word2Vec. Each evolved DNN was trained for three epochs and the classification accuracy on the testing set was returned as the fitness. Preliminary experiments showed that three epochs of training was enough for the network performance to converge. Thus, unlike vision domains such as Chest X-rays, described in the next example, there was no need for an extra step after evolution where the best evolved network was trained extensively from scratch. The training and evaluation of networks at every generation were distributed over 100 worker machines. Details regarding specific evolution configuration and search space explored in this Wikidetox domain example are shown in Table 2 and Table 3, respectively.

TABLE 2

| Evolution paramater | Value |
|---|---|
| Module population size | 56 |
| Add module node prob | 0.05 |
| Add module connection prob | 0.05 |
| Module species size | 4 |
| Blueprint population size | 22 |
| Add blueprint node prob | 0.05 |
| Blueprint species size | 1 |

TABLE 3

| Search space parameter | Range |
|---|---|
| Layer types | [Conv1D, LSTM, GRU, Dropout] |
| Layer width | [64, 192] |
| Kernel Size | [1, 3, 5, 7] |
| Activation Function | [ReLU, Linear, ELU, SeLU] |
| Weight Initializer | [Glorot, He] |
| Dropout Rate | [0, 0.5] |
| Weight Decay | [1e−9, 1e−3] |
| Minimum pooling layers | 5 |
| Weight sharing between layers | False |

Figure 5:
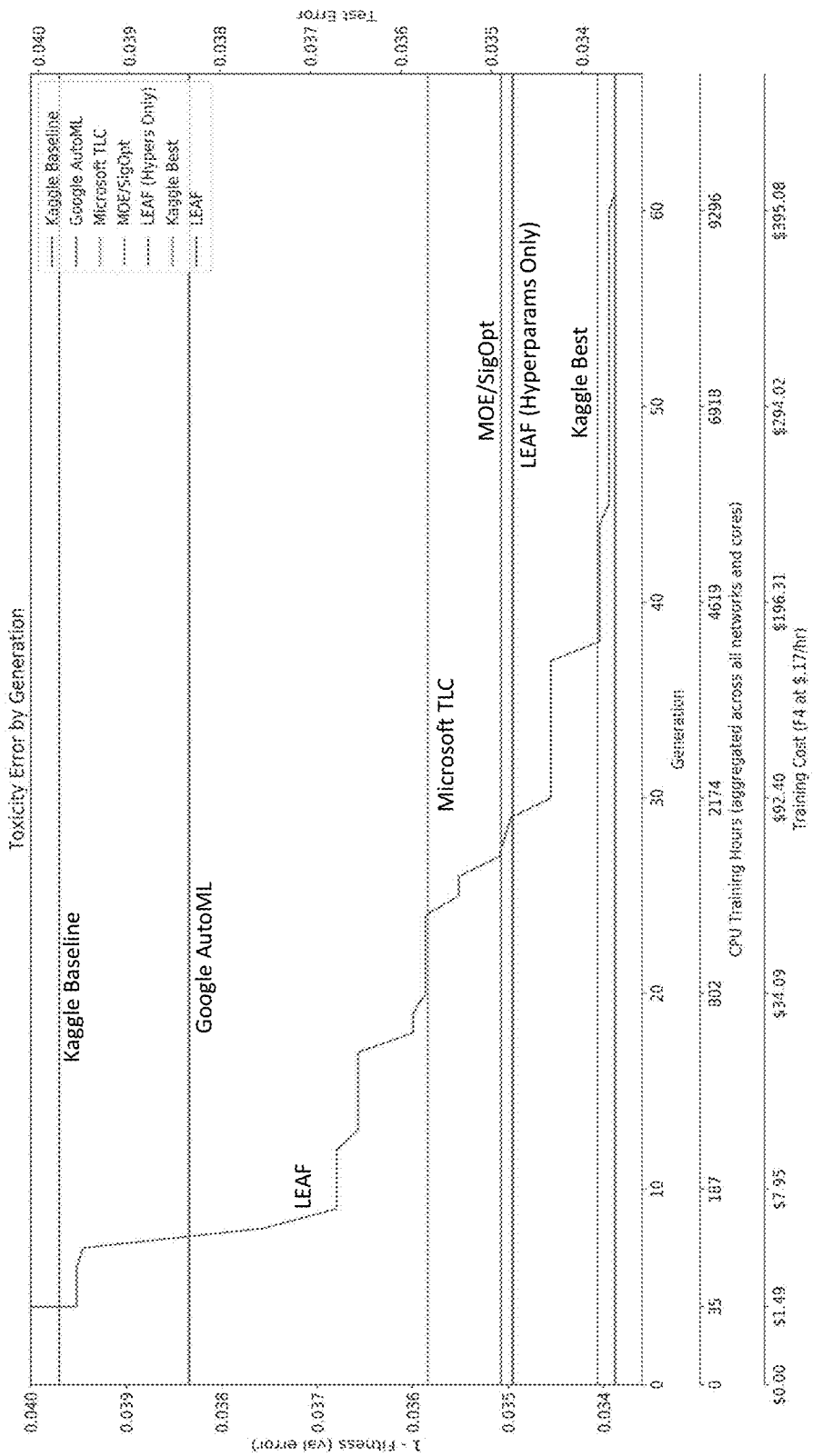
FIG. 5 graphs comparison of MCDN AutoML discovered network fitness versus various commercially available AutoML methods on the Wikidetox domain.

FIG. 5 shows a comparison of LEAF architecture search against several other approaches. The y-axis shows the best best fitness (i.e. accuracy) achieved so far, while the x-axes shows the generations, total training time, and total amount of money spent on cloud compute. As the plot shows, LEAF is gradually able to discover better networks, eventually finding one in the 40th generation that outperforms all other approaches. The first one is the baseline network from a Kaggle competition (crowdsourced machine learning competition hosting site), illustrating performance that a naive user can expect by applying a standard architecture to a new problem. After spending just 35 CPU hours, LEAF found architectures that exceeded that performance. The next three comparisons illustrate the power of LEAF against other AutoML systems. After about 180 hours, LEAF exceeded the performance of Google AutoML's text classifier optimization with default compute resources. After about 1000 hours, LEAF surpassed Microsoft's TLC library for model pipeline optimization, and after 2000 hours, it exceeded MOE, a Bayesian optimization library (both libraries used enough compute resources for the performance to plateau). The LEAF hyperparameter-only version performed slightly better than MOE, demonstrating the power of evolution against other optimization approaches. Finally, if the user is willing to spend about 9000 hours of CPU time on this problem, the result is state-of-the-art performance. At that point, LEAF discovered architectures that exceed the performance of Kaggle competition winner, i.e. improve upon the best known hand-design. The performance gap between this result and the hyperparameter-only version of LEAF is also important: it shows the value added by optimizing network architectures, demonstrating that it is an essential ingredient in improving the state-of-the-art.

Figure 6:
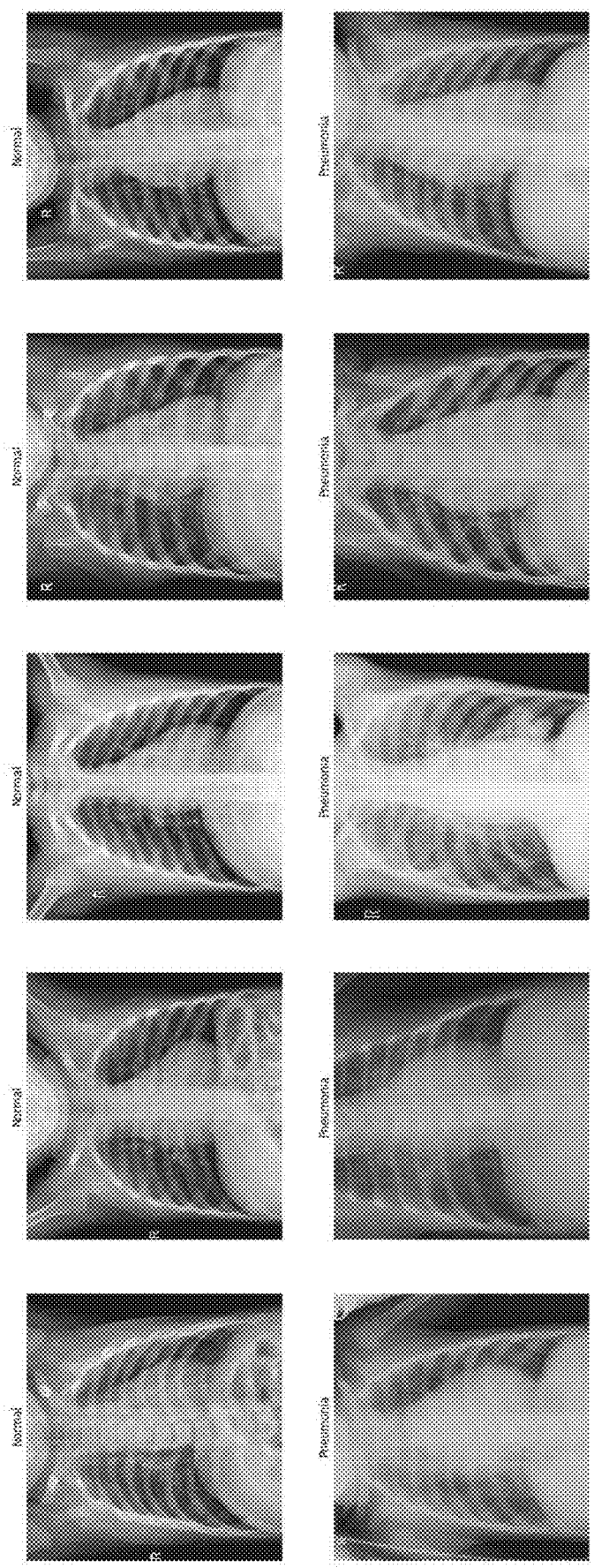
FIG. 6 includes exemplary chest x-ray images from the MTL benchmark set domain used in accordance with one or more embodiments described herein.
Figure 7A:
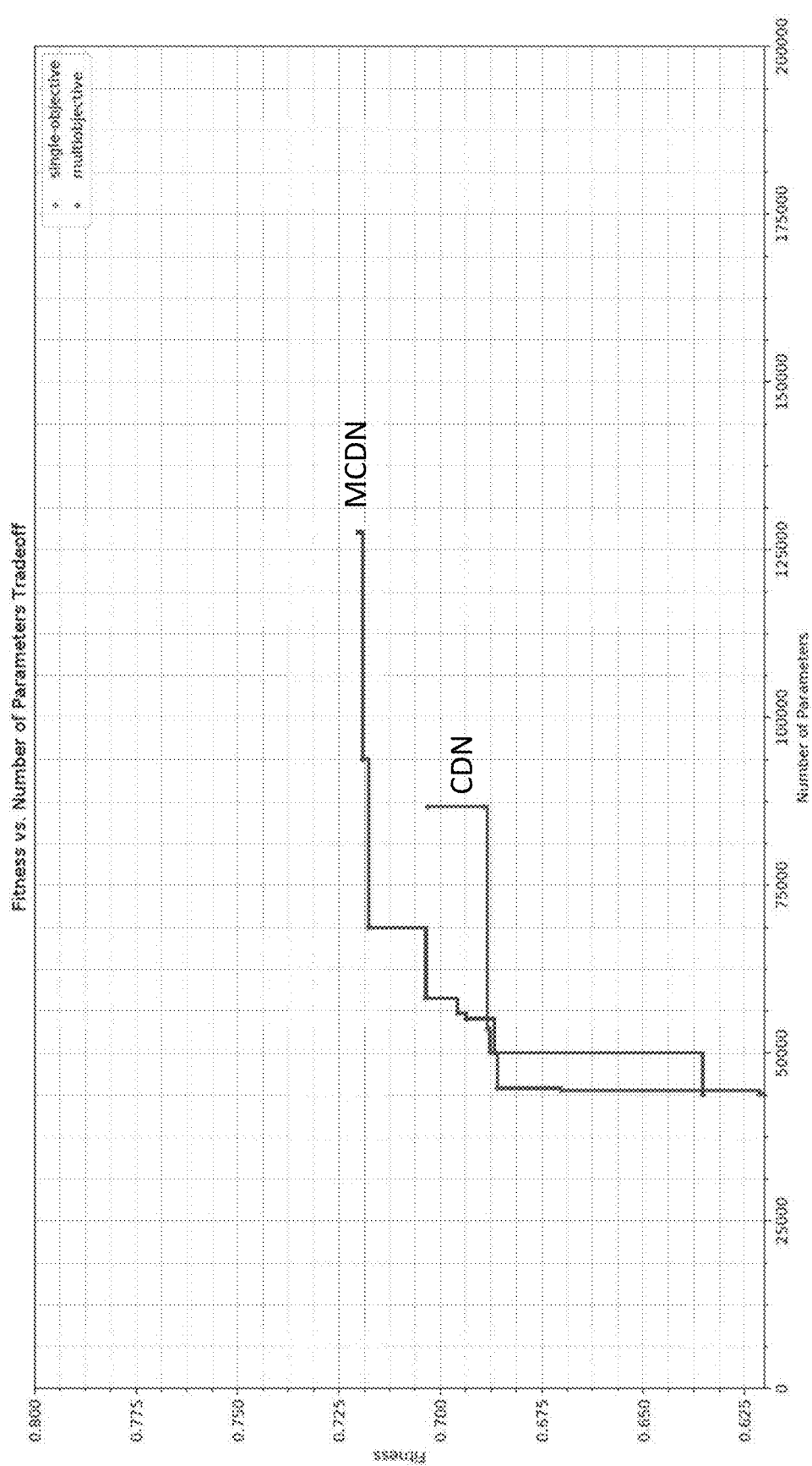
FIGS. 7a to 7f illustrate comparison of Pareto fronts generated by the LEAF AutoML system using CDN and MCDN at various generations of network discovery in the chest x-ray MTL domain.
Figure 7B:
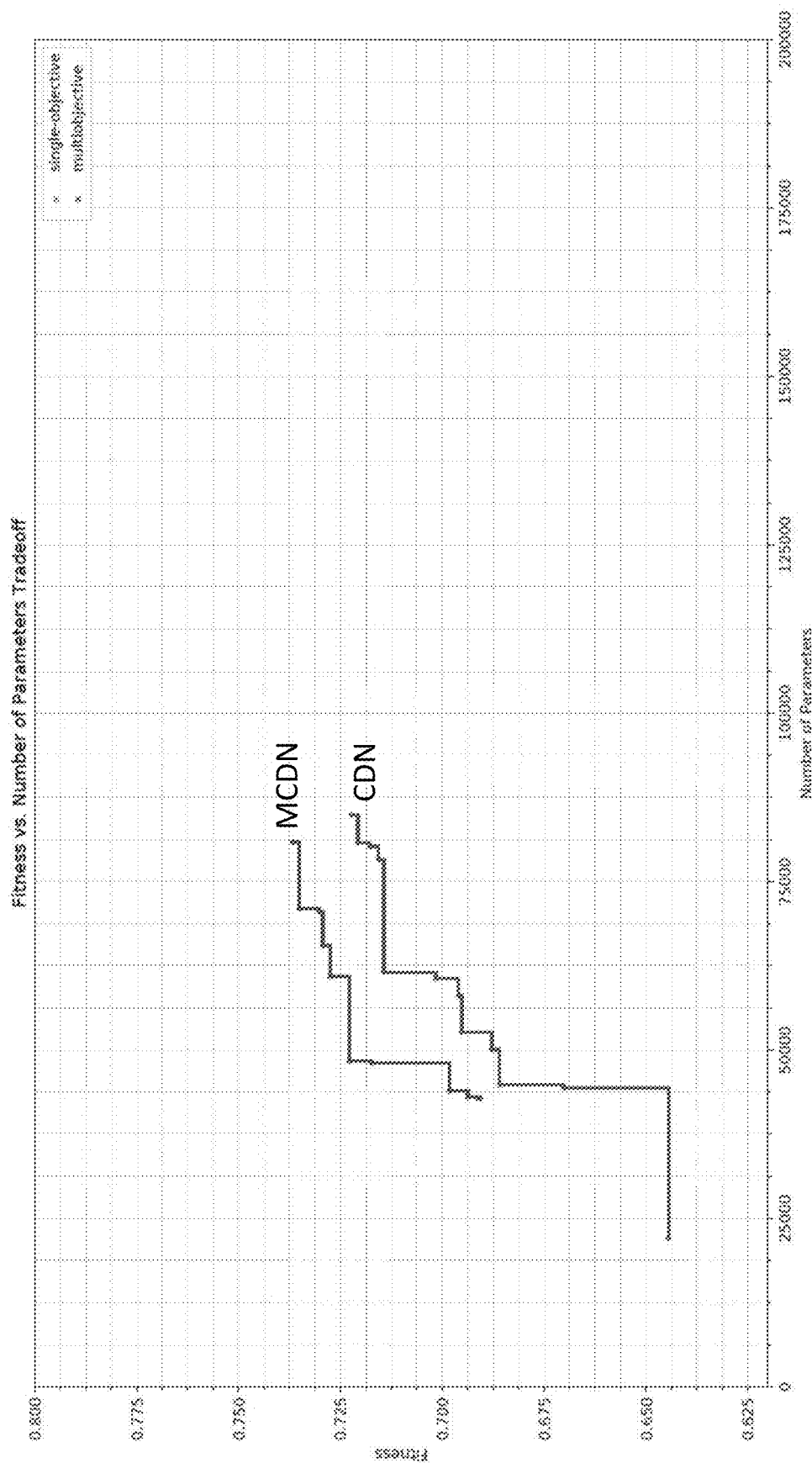
Figure 7C:
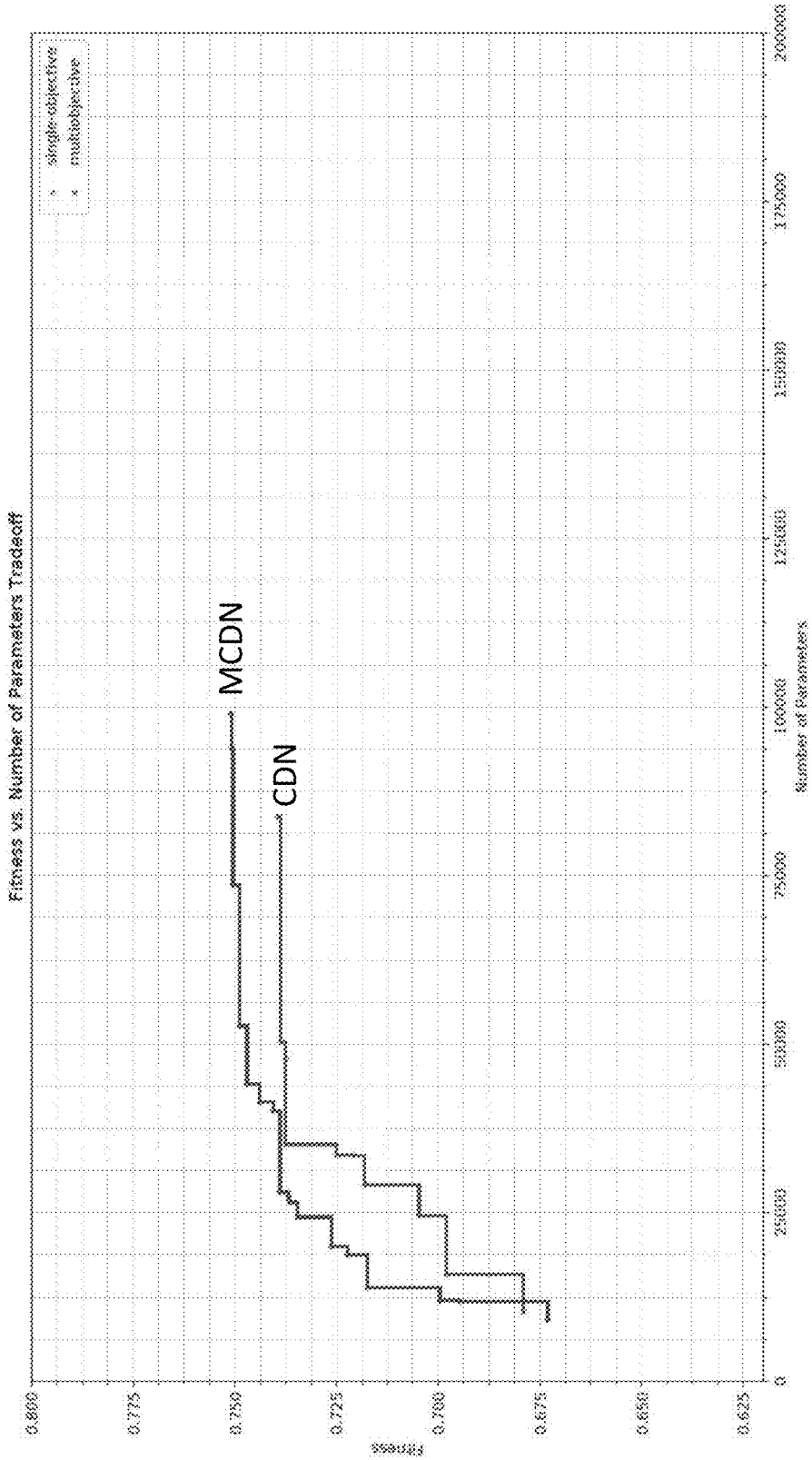
Figure 7D:
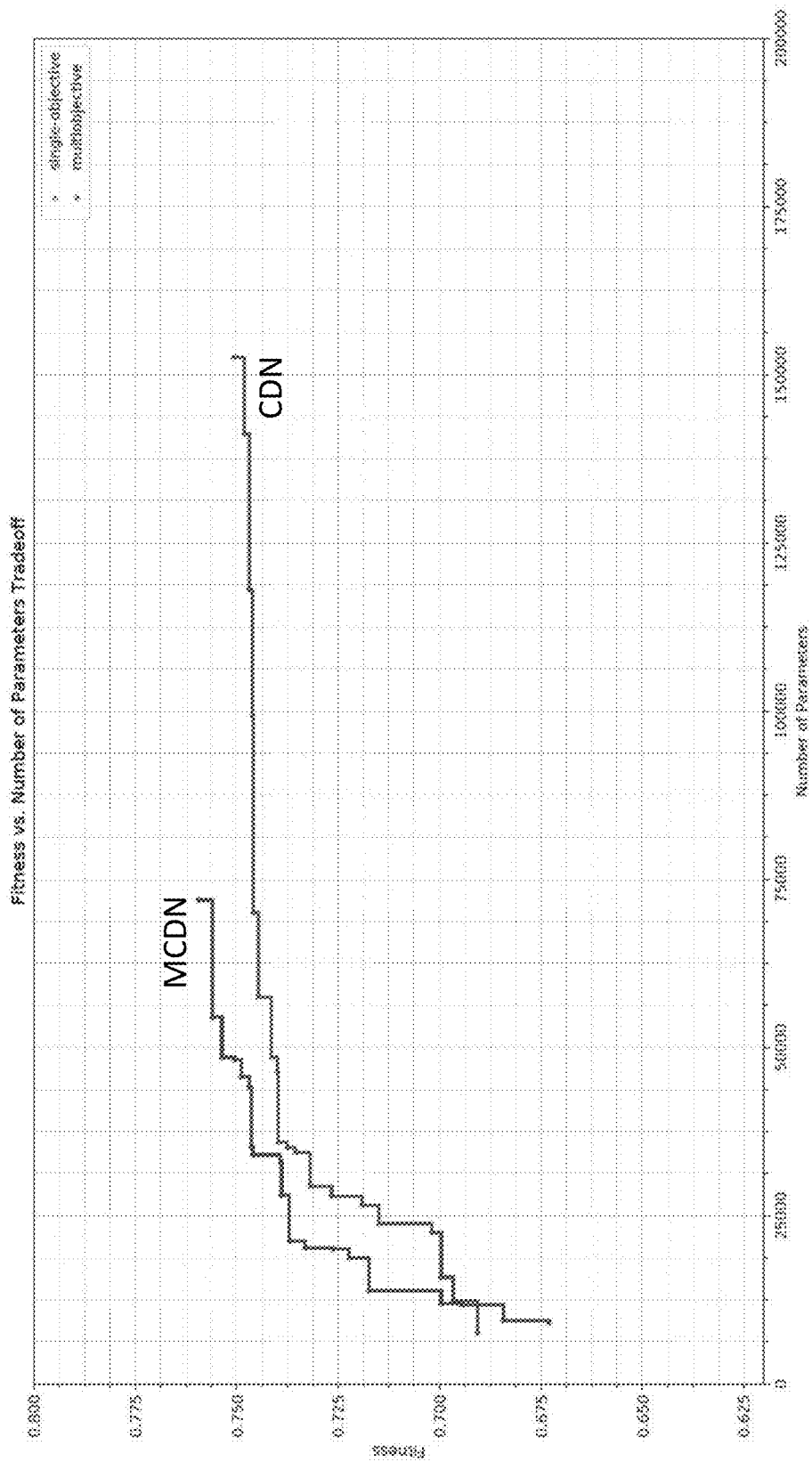
Figure 7E:
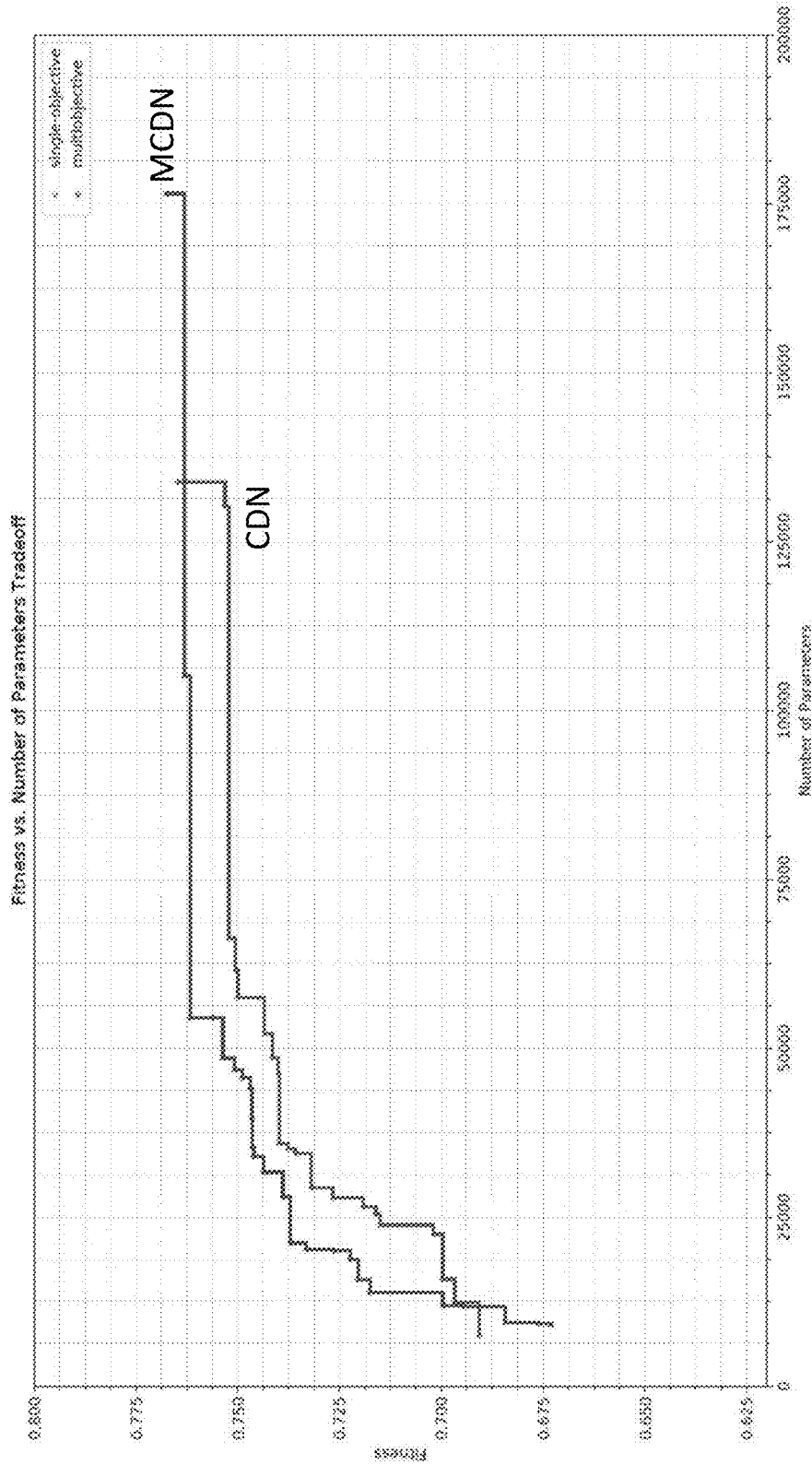
Figure 7F:
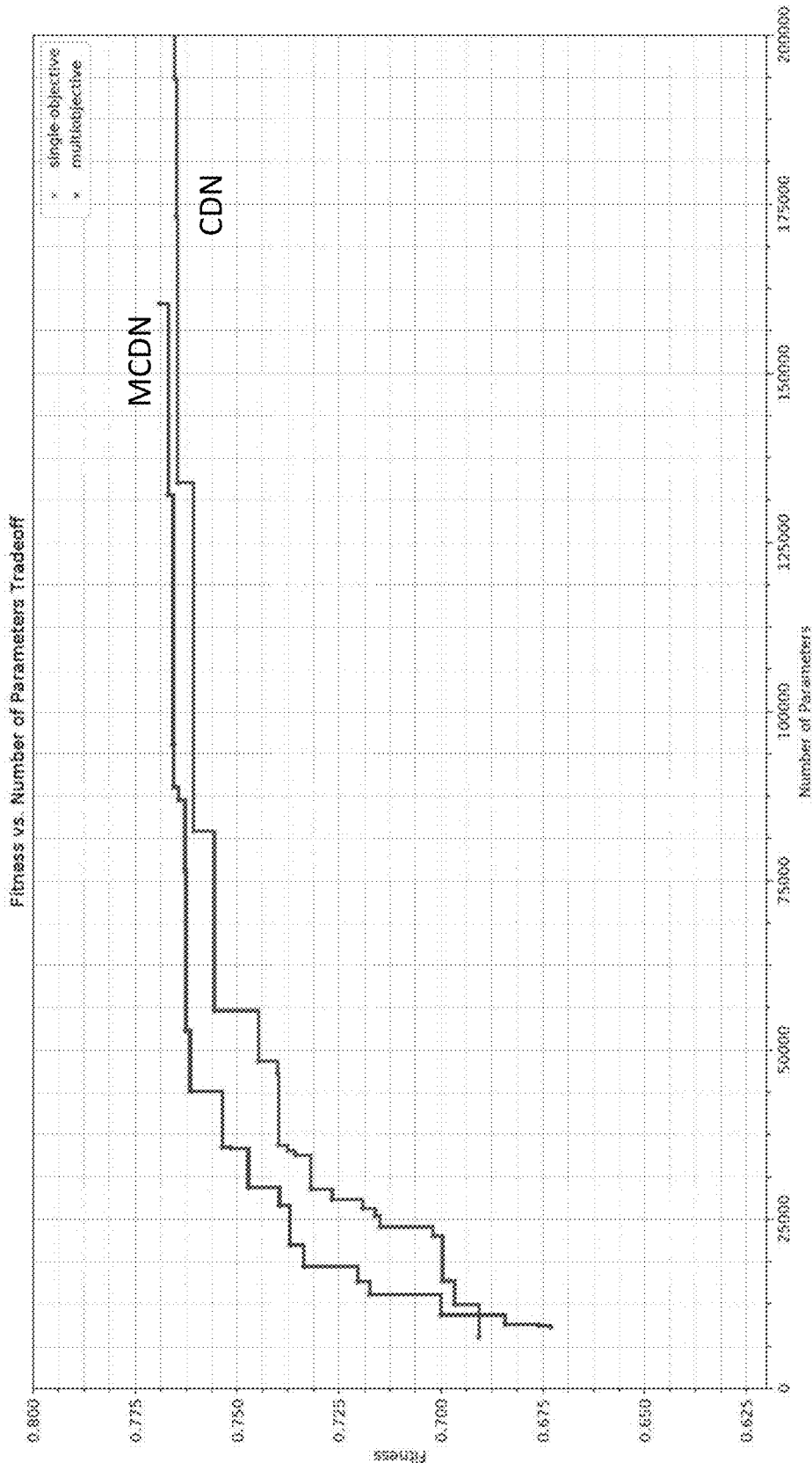

Next, LEAF was also run against the recently introduced chest x-rays classification MTL (multitask learning) benchmark that involves classifying x-ray images of the chest region of various patients. The images are labeled with one or more of 14 different diseases, or no diseases at all. The multi-label nature of the dataset naturally lends to an MTL setup where each disease is an individual binary classification task. Both positive and negative example images from the Chest X-ray dataset are shown in FIG. 6.

This domain is considered to be significantly more difficult than the Omniglot domain since the images are less sparse and more complex in content. In fact, even for humans, it takes a trained eye to diagnosis what diseases are present in each image. Past approaches generally apply the classical MTL DNN architecture and the current state-of-the-art approach uses a slightly modified version of Densenet, a widely used, hand-designed architecture that is competitive with the state-of-the-art on the Imagenet domain. The images are divided into 70% training, 10% validation, and 20% test while the metric used to evaluate the performance of the network is the average area under the ROC curve for all the tasks (AUROC). Although the actual images are larger, all existing approaches preprocess the images to be 224×224 pixels, the same size used by many Imagenet DNN architectures.

Since Chest X-rays is a multitask dataset, LEAF was configured to use the MCDN (MTL variant of CoDeepNEAT) to evolve network architectures. The search space for these architectures was designed around 2D convolutional layers and includes skip connections seen in networks such as ResNet. For fitness evaluations, all networks were trained using Adam for eight epochs. After training was completed, AUROC was computed over all images in the validation set and returned as the fitness. No data augmentation was performed during training and evaluation in evolution, but the images were normalized using the mean and variance statistics from the Imagenet dataset. The average time for training was usually around 3 to 4 hours depending on the network size, although for some larger networks the training time exceeded 12 hours. Like in the Wikidetox domain, the training and evaluation were parallelized over 100 worker machines. For more information regarding evolution configuration and search space explored, refer to Table 4 and Table 5, respectively.

TABLE 4

Chest X-rays domain

| | |
|---|---|
| Module population size | 56 |
| Add module node prob | 0.08 |
| Add module connection prob | 0.08 |
| Module species size | 4 |
| Blueprint population size | 22 |
| Add blueprint node prob | 0.16 |
| Add blueprint connection prob | 0.12 |
| Blueprint species size | 1 |
| Assembled population size | 100 |

TABLE 5

Chest X-rays domain

| | |
|---|---|
| Layer types | [Conv2D, Dropout] |
| Layer width | [16, 64] |
| Kernel Size | [1, 3] |
| Activation Function | [ReLU, Linear, ELU, SeLU] |
| Weight Initializer | [Glorot, He] |
| Dropout Rate | [0, 0.7] |
| Weight Decay | [1e-9, 1e-3] |
| Minimum pooling layers | 4 |
| Weight sharing between layers | True |

After evolution converged, the best evolved network was trained for an increased number of epochs using the ADAM optimizer. As with other approaches to neural architecture search, the model augmentation method was used, where the number of filters of each convolutional layer was increased. Data augmentation was also applied to the images during every epoch of training, including random horizontal flips, translations, and rotations. The learning rate was dynamically adjusted downward based on the validation AUROC every epoch and sometimes reset back to its original value if the validation performance plateaued. After training was com-plete, the testing set images were evaluated 20 times with data augmentation enabled and the network outputs were averaged to form the final prediction result.

Table 6 compares the performance of the best evolved networks with existing approaches that use hand-designed network architectures on a holdout testing set of images. These include results from the authors who originally introduced the Chest X-rays dataset and also CheXNet, which is the currently published state-of-the-art in this task. For comparison with other AutoML systems, results from Google AutoML are also listed. Google AutoML was set to optimize a vision task using a preset time of 24 hours (the higher of the two time limits available to the user), with an unknown amount of compute and number of worker machines. Due to the size of the domain, it was not practical to evaluate Chest X-rays with other AutoML methods. The performance of best network discovered by LEAF (MCDN) matches that of the human designed CheXNet. LEAF (MCDN) is also able to exceed the performance of Google AutoML by a large margin of nearly 4 AUROC points. These results demonstrate that state-of-the-art results are possible to achieve even in domains that require large, sophisticated networks.

TABLE 6

| Algorithm | Test AUROC (%) |
|---|---|
| 1. Wang, et al. (2017) [50] | 73.8 |
| 2. CheXNet (2017) [41] | 84.4 |
| 3. Google AutoML (2018) [1] | 79.7 |
| 4. LEAF | 84.3 |

When LEAF used MCDN to maximize fitness and minimize network size, LEAF actually converged faster during evolution to the same final fitness. As expected, MCDN was also able to discover networks with fewer parameters. Referring to FIGS. 7a to 7f, the x-axis shows number of parameters (secondary objective) and the y-axis shows AUROC fitness (primary objective). The Pareto front for MCDN dominates over the single objective Pareto front. In other words, MCDN discovered trade-offs between complexity and performance that are always better than those found by standard, single-objective CDN. MCDN not only found architectures with state-of-the-art performance, but also networks that are smaller and therefore more practical. Although single-objective LEAF used CDN, it was possible to generate a Pareto front by giving the primary and secondary objective values of all the networks discovered in past generations to Algorithm D (see above). The Pareto front for MCDN was also created the same way.

Interestingly, MCDN discovered good networks in multiple phases. In generation 10 (FIG. 7a), networks found by these two approaches have similar average complexity but those evolved by MCDN have much higher average fitness. This situation changes later in evolution and by generation 40 (FIG. 7c), the average complexity of the networks discovered by MCDN is noticeably lower than that of CDN, but the gap in average fitness between them has also narrowed. MCDN first tried to optimize for the first objective (fitness) and only when fitness was starting to converge, did it try to improve the second objective (complexity). In other words, MCDN favored progress in the metric that was easiest to improve upon at the moment and did not get stuck; it would try to optimize another objective if no progress was made on the current one.

Figure 8C:
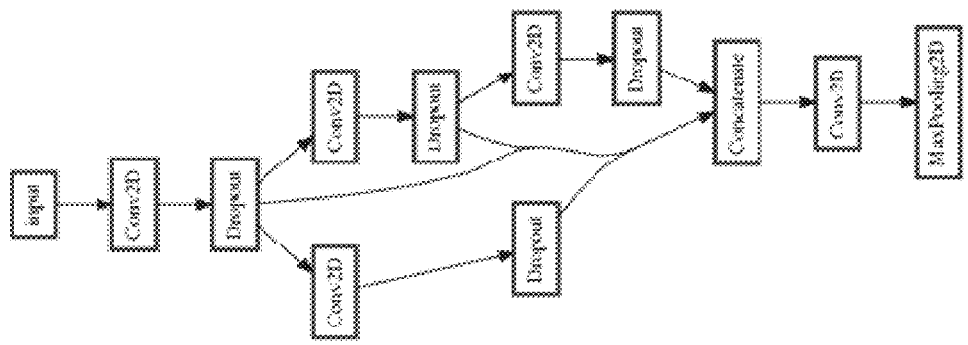
FIGS. 8a to 8c are visualizations of networks with different complexity discovered by MCDN in the chest x-ray MTL domain.
Figure 8B:
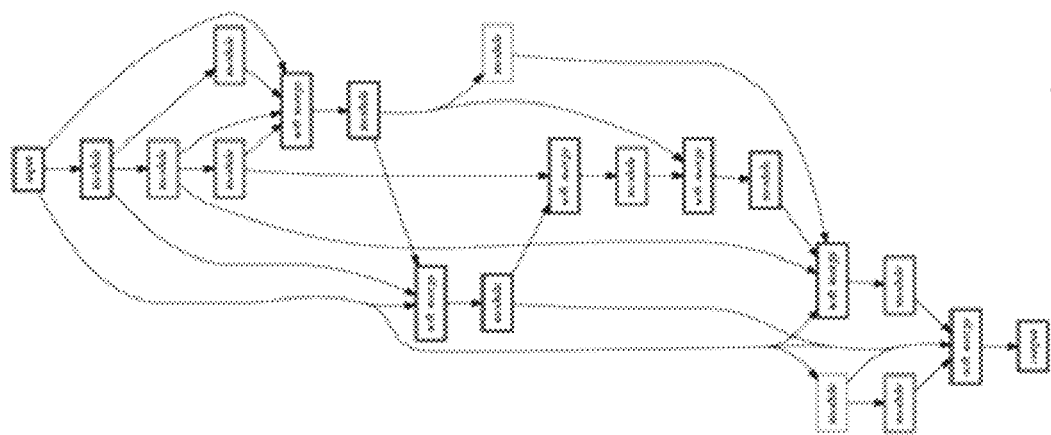
Figure 8A:
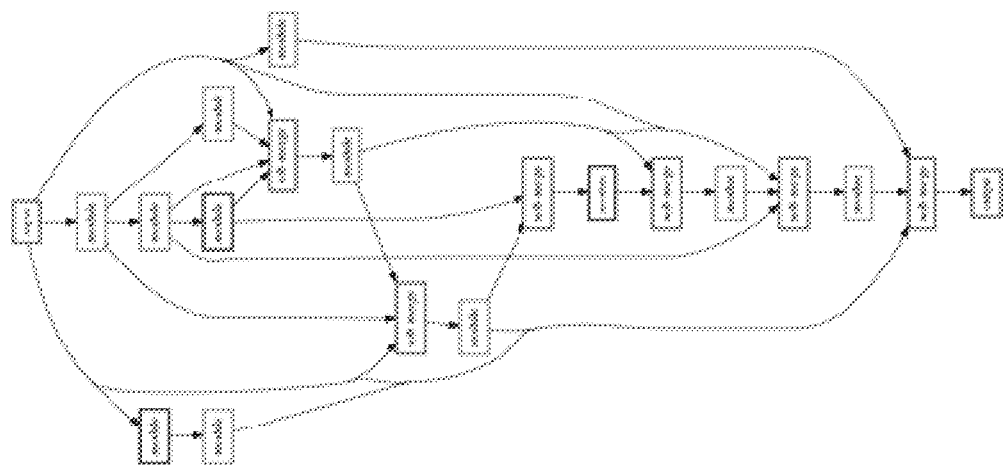

Visualizations of selected networks evolved by MCDN are shown in FIGS. 8a to 8c. MCDN was able to discover a very powerful network (FIG. 8b) that achieved 77% AUROC after only eight epochs of training. This network has 125K parameters and is already much smaller than networks with similar fitness discovered with CDN. Furthermore, MCDN was able to discover an even smaller network (FIG. 8a) with only 56K parameters and a fitness of 74% AUROC after eight epochs of training. The main difference between the smaller and larger network is that the smaller one uses a particularly complex module architecture (FIG. 8c) only two times within its blueprint while the larger network uses the same module four times. This result shows how a secondary objective can be used to bias the search towards smaller architectures without sacrificing much of the performance.

The embodiments described herein show that multiobjective optimization is effective in discovering networks that trade-off multiple metrics. As seen in the Pareto fronts of FIGS. 7a-7f, the networks discovered by MCDN dominate those evolved by CDN with respect to the complexity and fitness metrics in almost every generation. Further, MCDN also maintains a higher average fitness with each generation. By minimizing network complexity, MCDN produces a regularization effect that also improves the generalization of the network. This effect may be due to the fact that networks evolved by MCDN reuse modules more often when compared to CDN.

An additional benefit of application of MCDN through the LEAF is to take advantage of multiple related datasets. When there is minimal data to train a DNN in a particular task, other tasks in a multitask setting can help achieve good performance. Evolutionary AutoML via LEAF thus forms a framework for utilizing DNNs in domains that otherwise would be impractical due to lack of data.

As exemplified herein through the embodiments, LEAF can outperform existing state-of-the-art AutoML systems and the best hand designed solutions. The hyperparameters, components, and topology of the architecture can all be optimized simultaneously to fit the requirements of the ask, resulting in superior performance. LEAF achieves such results even if the user has little domain knowledge and provides a naive starting point, thus democratizing AI. With LEAF, it is also possible to optimize other aspects of the architecture at the same time, such as size, making it more likely that the solutions discovered are useful in practice.

In addition to the description herein and supportive thereof, the following documents are considered to be part of this disclosure and are hereby incorporated by reference for all purposes as if fully set forth herein: J. Z. Liang, E. Meyerson, and R. Miikkulainen. 2018. Multiobjective Coevolution of Deep Neural Network Architectures; E. Meyerson and R. Miikkulainen. 2018. Pseudo-Task Augmentation: From Deep Multitask Learning to Intratask Sharing and Back. ICML (2018); J. Z. Liang, E. Meyerson, and R. Miikkulainen. 2017. Evolutionary Architecture Search For Deep Multitask Networks GECCO '18, Jul. 15-19, 2018; E. Meyerson and R. Miikkulainen. 2018. Beyond Shared Hierarchies: Deep Multitask Learning through Soft Layer Ordering. ICLR (2018); R. Miikkulainen, J. Liang, E. Meyerson, et al. 2017. Evolving deep neural networks. arXiv preprint arXiv: 1703.00548 (2017); J. Z Liang, Elliot Meyerson, Babak Hodj at, Dan Fink, Karl Mutch, and Risto Miikkulainen. 2019. Evolutionary Neural AutoML for Deep Learning. In Genetic and Evolutionary Computation Conference (GECCO '19), Jul. 13-17, 2019, Prague, Czech Republic; J. Z. Liang, Evolutionary Neural Architecture Search for Deep Learning, Dissertation, University of Texas, December 2018.

We claim as follows:

1. A computer-implemented method for co-evolution of hyperparameters and architecture in accordance with multiple objective optimization, the method comprising:
    initializing a first population of modules and a first population of blueprints containing a combination of one or more existing species of modules in the first population of modules, wherein each module is a graph including at least one node representing a deep neural network (DNN) layer and corresponding hyperparameters, and further wherein the initialization process is performed during each generation of an evolution run in a plurality of generations of subsequent populations for each existing species of modules in each of the first population of modules and the first population of blueprints:
        creating a first set of modules empty of species;
        for each existing species of modules, determining Pareto front of individuals for each existing species in accordance with at least a first and second objective, wherein for each individual, an individual fitness function is determined for the first objective and an individual novelty score is determined for the second objective, further wherein determining the Pareto front for each existing species of individual includes,
            sorting the individuals for each existing species in a descending order by the individual fitness function;
            creating a new Pareto front with a first individual from each existing species;
            and for each successive individual in an existing species, if a corresponding individual novelty score of a successive individual is greater than that of a preceding individual, adding the successive individual to the Pareto front;
        removing individuals in the Pareto front of each existing species and adding them to the first set of modules empty of species to form a set of new species of modules;
    replacing each existing species of modules with the new species of modules;
    truncating each set of the new species of modules by preserving a predetermined fraction of modules within each set of new species of modules, wherein the modules within each set of new species of modules are ranked in accordance with a module fitness function and a module novelty score and the predetermined fraction of modules is preserved from the modules with the highest rankings;
    generating new individuals from the truncated sets of new species of modules using procreation, including crossover and/or mutation;
    wherein the new individuals are added to a next population of modules and a next population of blueprints containing a combination of one or more existing species of modules; and
    after each generation,
        assembling networks using the modules and blueprints from the generated new individuals,
        ranking the assembled networks in accordance with a network fitness function and a network novelty score, and
        preserving a predetermined fraction of assembled networks in accordance with the ranking, wherein the predetermined fraction of assembled networks is preserved from assembled networks with the highest rankings.

2. The method of claim 1, further including sorting the Pareto front in a descending order based on the individual novelty score.

3. The method of claim 1, wherein the first objective is performance of the individual relative to a benchmark.

* * * * *